(12) United States Patent
Danzuka et al.

(10) Patent No.: US 11,560,003 B2
(45) Date of Patent: Jan. 24, 2023

(54) RECORDING APPARATUS, CONTROL METHOD, AND STORAGE MEDIUM

(71) Applicant: CANON KABUSHIKI KAISHA, Tokyo (JP)

(72) Inventors: Toshimitsu Danzuka, Tokyo (JP); Masataka Kato, Kanagawa (JP); Hiroto Kango, Tokyo (JP); Rie Takekoshi, Kanagawa (JP); Akihiro Tomida, Kanagawa (JP); Tomoki Yamamuro, Kanagawa (JP); Keita Ishimi, Kanagawa (JP); Kazuki Narumi, Tokyo (JP); Taku Yokozawa, Kanagawa (JP); Kazuo Suzuki, Kanagawa (JP); Kazuhiko Sato, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 17 days.

(21) Appl. No.: 17/373,176

(22) Filed: Jul. 12, 2021

(65) Prior Publication Data
US 2022/0016917 A1   Jan. 20, 2022

(30) Foreign Application Priority Data
Jul. 17, 2020  (JP) .............................. JP2020-123120

(51) Int. Cl.
*B41J 2/165*  (2006.01)
*B41J 29/38*  (2006.01)
(Continued)

(52) U.S. Cl.
CPC .......... *B41J 29/38* (2013.01); *B41J 2/16517* (2013.01); *B41J 25/001* (2013.01);
(Continued)

(58) Field of Classification Search
CPC ...................................................... B41J 2/165
See application file for complete search history.

(56) References Cited

U.S. PATENT DOCUMENTS

2007/0291074 A1\* 12/2007 Kawamata ........... B41J 2/16517
347/35
2009/0109258 A1\* 4/2009 Nitta .................... B41J 2/16535
347/33

FOREIGN PATENT DOCUMENTS

JP        2006341461 A    12/2006

\* cited by examiner

*Primary Examiner* — Julian D Huffman
(74) *Attorney, Agent, or Firm* — Canon U.S.A., Inc. IP Division

(57) ABSTRACT

A recording apparatus includes a recording unit, a scanning unit configured to perform relative scanning by moving the recording unit and a recording medium relative to each other at least once with respect to a unit region on the recording medium, a recovery unit configured to perform a recovery operation for maintaining or recovering a recording performance of the recording unit for application of a recording material, and a control unit configured to control the recovery unit, wherein the control unit acquires recording mode information about recording of an image to be performed on a recording medium for (n+1)-th page (n being a natural number) and determines, based on the acquired recording mode information, whether to perform an inter-page recovery operation at timing after recording of an image on a recording medium for n-th page ends and before recording of an image on a recording medium for (n+1)-th page starts.

27 Claims, 20 Drawing Sheets

(51) Int. Cl.
*H04N 1/12* (2006.01)
*B41J 25/00* (2006.01)
*H04N 1/00* (2006.01)

(52) U.S. Cl.
CPC ........... *H04N 1/00084* (2013.01); *H04N 1/12* (2013.01); *B41J 2002/16573* (2013.01); *H04N 2201/0081* (2013.01); *H04N 2201/0082* (2013.01)

FIG.9

| ONE-PASS | | | | | | | |
|---|---|---|---|---|---|---|---|
| W | S | OPERATION TRIGGER T | WAIT | W | S | OPERATION TRIGGER T | WAIT |
| 1 | 1 | | 0 SECONDS | 1 | 0 | Ww (15 SECONDS) | 0 SECONDS |
| 2 | 0 | Ww (15 SECONDS) | 0 SECONDS | 2 | 1 | WE | — |
| 3 | 1 | WE | — | 3 | 0 | — | — |

| FOUR-PASS | | | | | | | |
|---|---|---|---|---|---|---|---|
| W | S | OPERATION TRIGGER T | WAIT | W | S | OPERATION TRIGGER T | WAIT |
| 1 | 1 | | 0 SECONDS | 1 | 0 | | 1 SECOND |
| 2 | 0 | | 1 SECOND | 2 | 1 | | 2 SECONDS |
| 3 | 1 | | 2 SECONDS | 3 | 0 | | 4 SECONDS |
| 4 | 0 | | 4 SECONDS | 4 | 1 | | 8 SECONDS |
| 5 | 1 | | 8 SECONDS | 5 | 0 | Ww (15 SECONDS) | 0 SECONDS |
| 6 | 0 | Ww (15 SECONDS) | 0 SECONDS | 6 | 1 | | 8 SECONDS |
| 7 | 1 | | 8 SECONDS | 7 | 0 | | 4 SECONDS |
| 8 | 0 | | 4 SECONDS | 8 | 1 | | 2 SECONDS |
| 9 | 1 | | 2 SECONDS | 9 | 0 | | 1 SECOND |
| 10 | 0 | | 1 SECOND | 10 | 1 | WE | — |
| 11 | 1 | WE | — | 11 | 0 | — | — |

FIG.13

| DUTY | | COEFFICIENT |
|---|---|---|
| GREATER THAN OR EQUAL TO 0% | LESS THAN 10% | 0.05 |
| GREATER THAN OR EQUAL TO 10% | LESS THAN 20% | 0.10 |
| GREATER THAN OR EQUAL TO 20% | LESS THAN 30% | 0.20 |
| GREATER THAN OR EQUAL TO 30% | LESS THAN 40% | 0.40 |
| GREATER THAN OR EQUAL TO 40% | LESS THAN 50% | 0.60 |
| GREATER THAN OR EQUAL TO 50% | LESS THAN 60% | 0.80 |
| GREATER THAN OR EQUAL TO 60% | LESS THAN 70% | 0.90 |
| GREATER THAN OR EQUAL TO 70% | LESS THAN 80% | 0.96 |
| GREATER THAN OR EQUAL TO 80% | LESS THAN 90% | 0.98 |
| GREATER THAN OR EQUAL TO 90% | LESS THAN OR EQUAL TO 100% | 1.00 |

FIG.14

| | | | ANOMALOUS TWO-PASS | | | | |
|---|---|---|---|---|---|---|---|
| W | S | OPERATION TRIGGER T | WAIT | W | S | OPERATION TRIGGER T | WAIT |
| 1 | 1 | | 0 SECONDS | 1 | 0 | Ww (15 SECONDS) | 0 SECONDS |
| 2 | 0 | Ww (15 SECONDS) | 0 SECONDS | 2 | 1 | WE | — |
| 3 | 1 | WE | — | 3 | 0 | — | — |

FIG.20

|  | MAIN SCANNING SPEED | | |
| --- | --- | --- | --- |
|  | 40 INCHES PER SECOND | 20 INCHES PER SECOND | 10 INCHES PER SECOND |
| ONE-PASS | 465 SECONDS | 465 SECONDS | 415 SECONDS |
| TWO-PASS | 430 SECONDS | 410 SECONDS | 370 SECONDS |
| FOUR-PASS | 400 SECONDS | 460 SECONDS | 280 SECONDS |
| EIGHT-PASS | 340 SECONDS | 260 SECONDS | 100 SECONDS |

RECORDING APPARATUS, CONTROL METHOD, AND STORAGE MEDIUM

BACKGROUND

Field of the Disclosure

Aspects of the present disclosure generally relate to a recording apparatus, a control method, and a storage medium each for recording an image on a recording medium.

Description of the Related Art

In inkjet recording apparatuses such as printers, there has been conventionally used a recording head in which a plurality of discharge ports for discharging ink is provided at approximately regular intervals. Due to, for example, a manufacturing error or temporal change of such a recording head, ink droplets which are discharged from a plurality of discharge ports may have variations in the volumes or discharge directions thereof. With a view to preventing or reducing density unevenness or streaks caused by such variations, there is known a multipass recording method, which records an image by causing a recording head to relatively scan a predetermined recording area on a recording medium a plurality of times.

Moreover, an inkjet recording apparatus is equipped with a recovery configuration for performing a recovery operation to maintain or recover an ink discharge performance, which may be decreased as a result of a discharge operation for ink. In what is called a serial scan type inkjet recording apparatus, which performs the above-mentioned multipass recording method, the recovery operation is performed at an interval between scanning operations of the recording head or at timing when an image recording operation on one sheet of recording medium has ended. On the other hand, since, during a period in which the recovery operation is performed, an image recording operation is not able to be performed, there is an issue in which a period of time required until the recording operation ends becomes long.

Japanese Patent Application Laid-Open No. 2006-341461 discusses performing a recovery operation using what is called wiping, which wipes a discharge port surface of a recording head, depending on recording modes. At this time, controlling the frequency of execution of wiping depending on recording modes is used to shorten a period of time required for recording and increase a throughput while keeping high image quality by maintaining or recovering an ink discharge performance.

On the other hand, when image recording is performed on a plurality of sheets of recording medium, in some cases, a recovery operation using, for example, wiping is performed during a period after a recording operation on a sheet of recording medium ends and before image recording is performed on a next sheet of recording medium. Hereinafter, a recovery operation which is performed at such timing is referred to as an "inter-page recovery operation". There is an issue in which performing an inter-page recovery operation may lead to starting of a recording operation on a next sheet of recording medium being delayed and, as a result, to a period of time required for recording becoming long.

SUMMARY

Embodiments of the present disclosure are generally directed to appropriately determining necessity of execution of an inter-page recovery operation and thus shortening a period of time required for recording and increasing a throughput while maintaining or recovering an ink discharge performance.

According to embodiments of the present disclosure, a recording apparatus includes a recording unit configured to record an image by applying a recording material by a recording element to a recording medium, a scanning unit configured to perform relative scanning by moving the recording unit and a recording medium relative to each other at least once with respect to a unit region on the recording medium, a recovery unit configured to perform a recovery operation for maintaining or recovering a recording performance of the recording unit for application of the recording material, and a control unit configured to control the recovery unit, wherein the control unit acquires recording mode information about recording of an image to be performed on a recording medium for (n+1)-th page (n being a natural number) and determines, based on the acquired recording mode information, whether to perform an inter-page recovery operation at timing after recording of an image on a recording medium for n-th page ends and before recording of an image on a recording medium for (n+1)-th page starts.

Further features of the present disclosure will become apparent from the following description of exemplary embodiments with reference to the attached drawings.

BRIEF DESCRIPTION OF THE DRAWINGS

FIG. 9 is a diagram illustrating a recording operation in the first exemplary embodiment.

FIG. 13 is a diagram illustrating a recording operation in the second exemplary embodiment.

FIG. 14 is a diagram illustrating a recording operation in the second exemplary embodiment.

FIG. 20 is a diagram illustrating a recording operation in the third exemplary embodiment.

DESCRIPTION OF THE EMBODIMENTS

Various exemplary embodiments, features, and aspects of the disclosure will be described in detail below with reference to the drawings.

Figure 1:
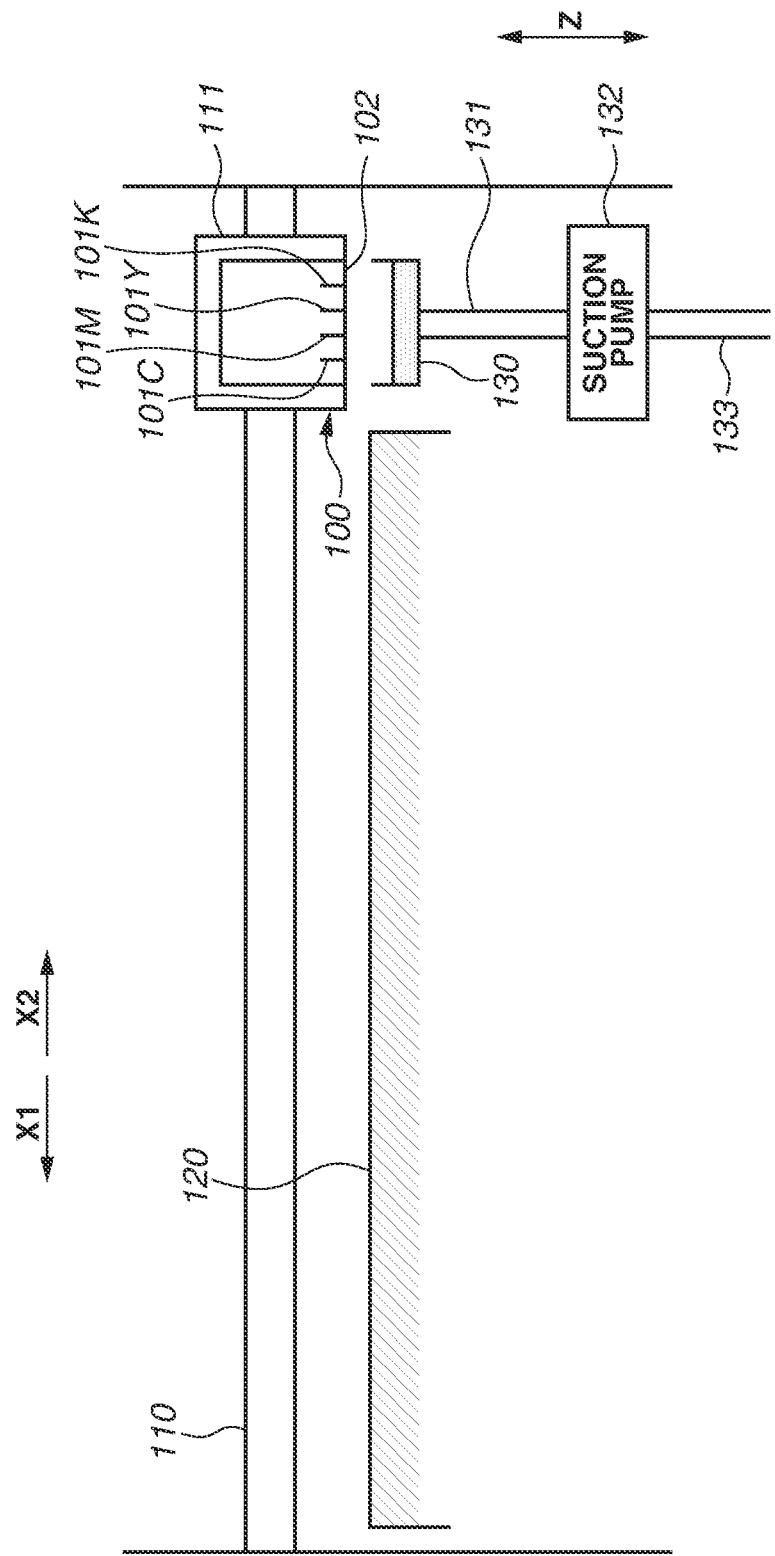
FIG. 1 is a schematic sectional view of an essential portion of an inkjet recording apparatus.
Figure 2:
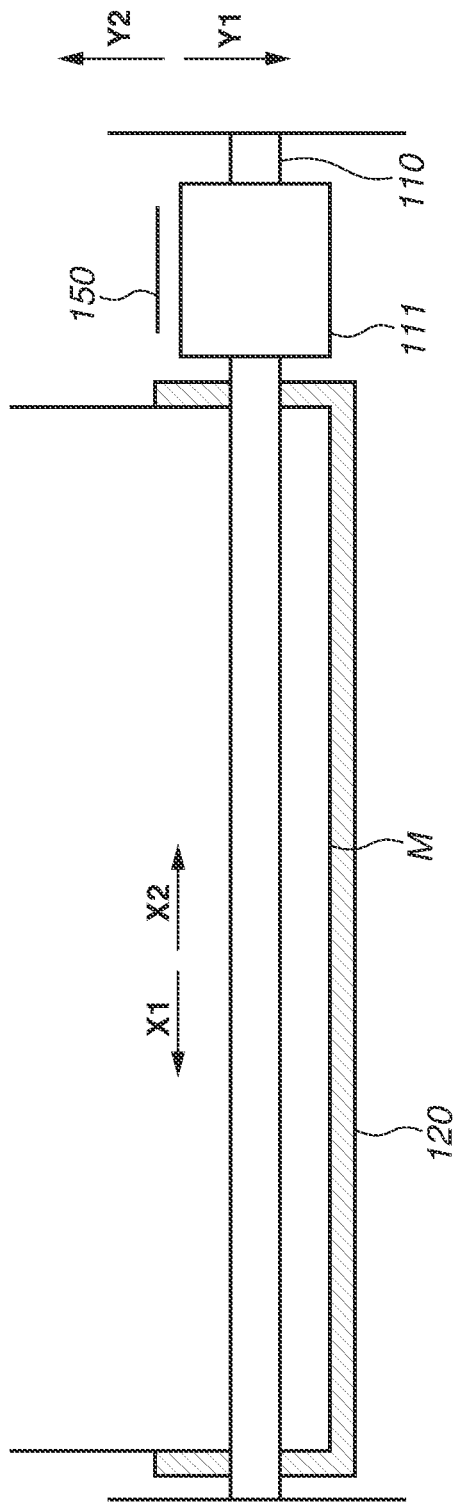
FIG. 2 is a schematic plan view of the essential portion of the inkjet recording apparatus.
Figure 3:
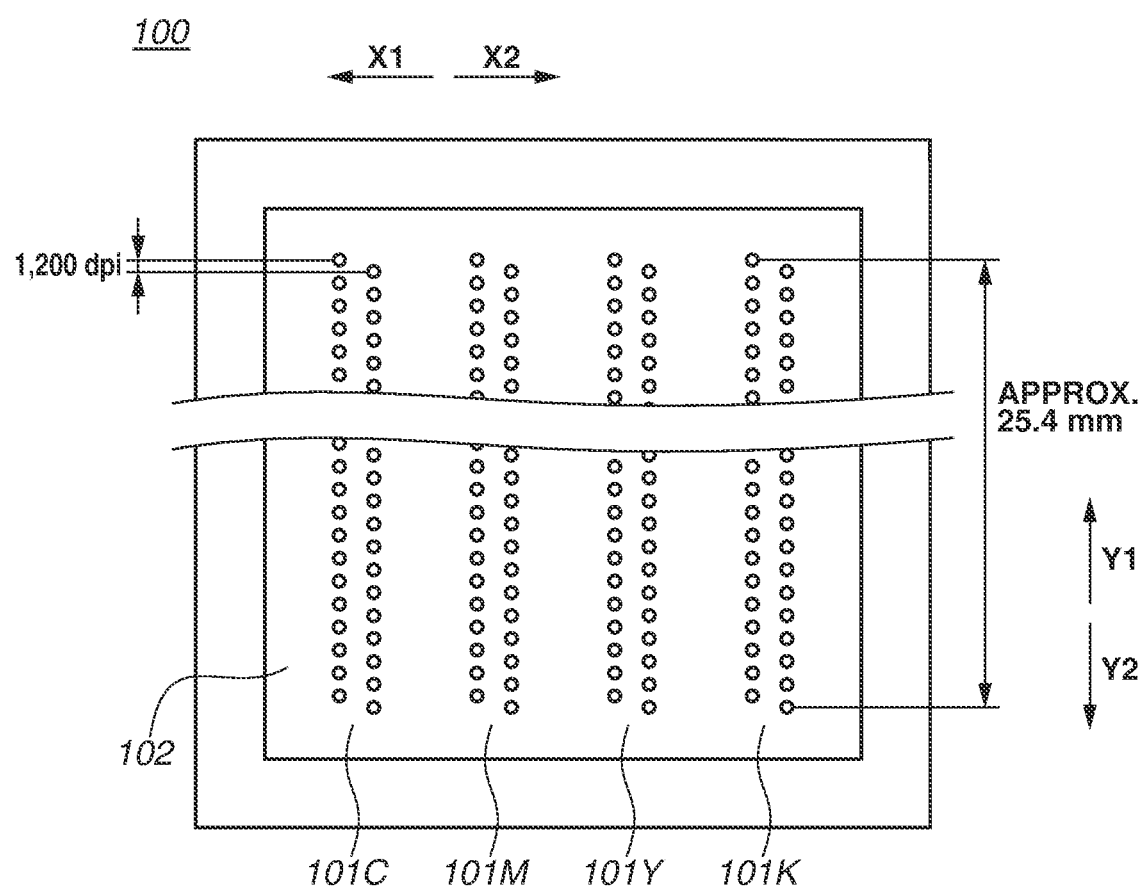
FIG. 3 is a schematic plan view of an essential portion of a recording head.

FIG. 1 and FIG. 2 are a schematic sectional view and a schematic plan view, respectively, of an essential portion of an inkjet recording apparatus according to a first exemplary embodiment, and FIG. 3 is a schematic plan view of an essential portion of a recording head.

Referring to FIG. 1, a discharge port surface 102 of a recording head 100 has, provided thereon, discharge port arrays 101C, 101M, 101Y, and 101K each for discharging ink. The discharge port array 101C is configured to discharge cyan ink, the discharge port array 101M is configured to discharge magenta ink, the discharge port array 101Y is configured to discharge yellow ink, and the discharge port array 101K is configured to discharge black ink. Furthermore, each discharge port array includes 1,200 discharge ports arrayed in a direction indicated by arrow Y1 or Y2 illustrated in FIG. 3, and the spatial density of discharge ports is 1,200 dots per inch (dpi). In the present specification, the illustrated direction Y1 (direction indicated by arrow Y1) is also referred to as a "sub-scanning direction". The inside of each discharge port includes an electro-thermal conversion member, and, in response to an electrical signal that is based on a drive signal being applied to the electro-thermal conversion member, a bubble is generated in ink present in the discharge port, so that, due to a pressure of the bubble, an ink droplet is discharged from the discharge port. The recording head 100 is supplied with color inks from respective ink tanks (not illustrated).

As illustrated in FIG. 1 and FIG. 2, the recording head 100 is mounted on a carriage 111, and the carriage 111 is guided by a guide shaft 110 and is moved to perform reciprocal scanning in the direction X1 (direction indicated by arrow X1) and the direction X2 (direction indicated by arrow X2) by the rotation of a carriage motor (not illustrated). Hereinafter, in the present specification, the illustrated direction X1 is also referred to as a "main scanning direction". A recording medium is conveyed intermittently in the direction Y1 illustrated in FIG. 2 on a platen 120 in association with an intermittent rotation of a conveyance motor (not illustrated). Then, during a period in which such a conveyance operation is stopped, the carriage 111 performs reciprocal movement in the direction X1 (forward direction) and the direction X2 (backward direction). During the scanning movement of the carriage 111, ink is discharged from each applicable discharge port, so that an image is recorded on a recording medium. Repeating an intermittent conveyance operation for a recording medium and a discharging operation in the process of a reciprocal scanning operation of the carriage 111 as mentioned above leads to an image being recorded on a recording medium for one page.

A cap 130 is configured to seal the discharge port surface, in which discharge ports are provided, to prevent or reduce a solvent included in ink from evaporating from discharge ports. The cap 130 is configured to be able to perform reciprocal movement in directions Z (directions indicated by double-headed arrow Z) between a capping position and a separation position. Additionally, the cap 130 is connected to a suction pump 132 via a pump tube 131, and is able to suction and eject ink or air from discharge ports by driving of the suction pump 132. Moreover, the inside of the cap 130 includes an ink absorber. Ink suctioned and ejected by driving of the suction pump 132 is conveyed via a waste ink tube 133 to be stowed in a maintenance cartridge (not illustrated). Furthermore, FIG. 1 illustrates a case where the cap 130 is situated at the separation position.

Referring to FIG. 2, a wiper 150 is a wiping member which is able to perform reciprocal movement in the illustrated directions Y1 and Y2 by being driven by a known mechanism. When moving in the direction Y1, the wiper 150 wipes the discharge port surface 102 of the recording head 100 to sweep away, for example, unnecessary ink or dust adhering to the discharge port surface 102, so that the recording performance of the recording head 100 is maintained or recovered.

After the wiper 150 performs a wiping operation while moving in the direction Y1, the carriage 111 is moved in the direction X1, so that the wiper 150 is prevented from coming into contact with the discharge port surface 102 when moving in the direction Y2. Then, after the wiper 150 is moved in the direction Y2, the carriage 111 is moved in the direction X2. Hereinafter, such a sweeping operation of the wiper 150 and the carriage 111 is referred to as "wiping" or a "wiping operation". Furthermore, when the wiping operation is performed, the cap 130 is situated at the separation position.

Figure 4:
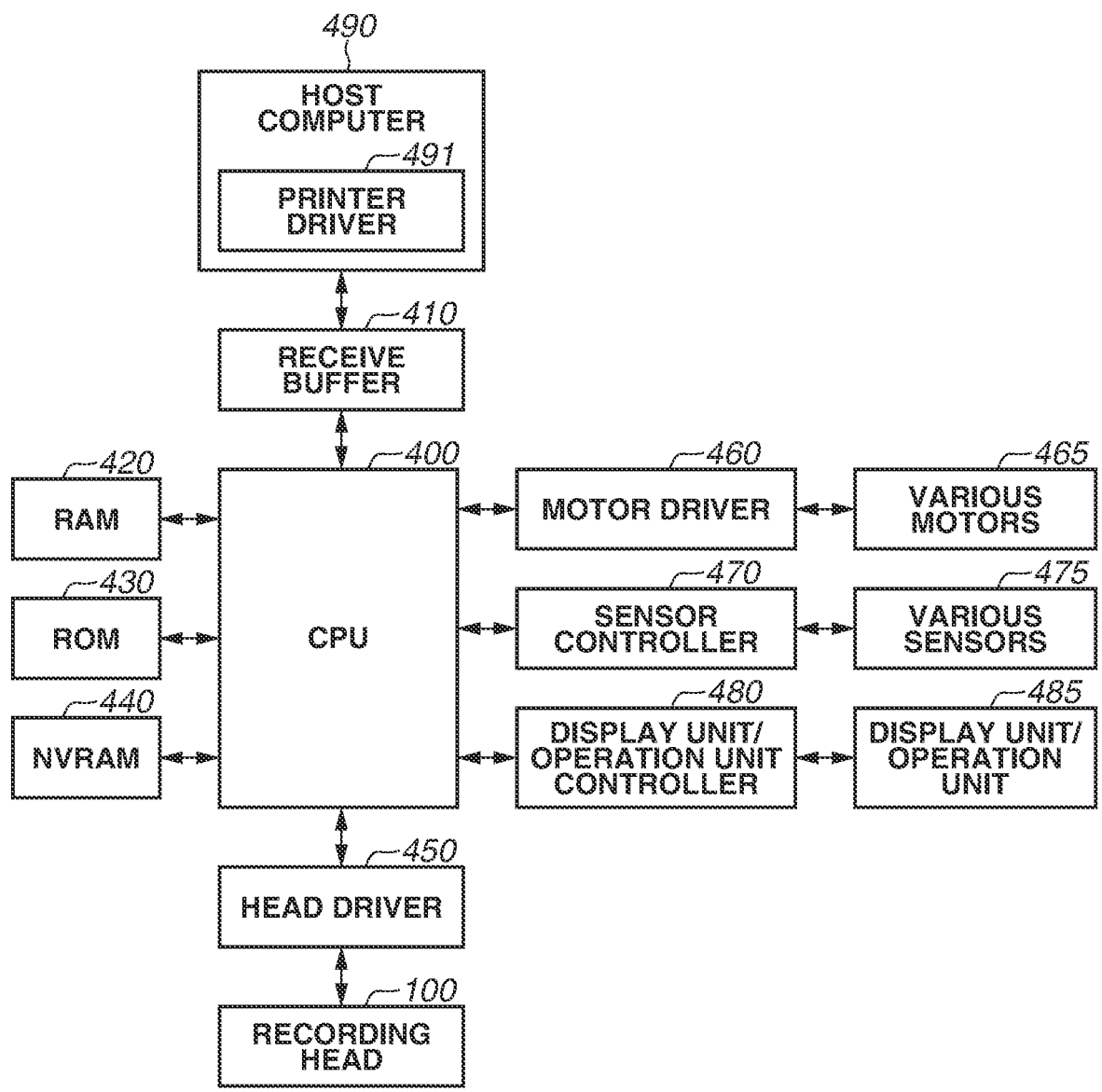
FIG. 4 is a block diagram of a control system of the inkjet recording apparatus.

Next, FIG. 4 is a block diagram illustrating a control system of the recording apparatus according to the present exemplary embodiment. A host computer 490 is connected to the recording apparatus via, for example, a Universal Serial Bus (USB) interface. A printer driver 491, which is stored in the host computer 490 in the form of software, is configured to generate print data from user-desired image data about, for example, a document or photograph in response to a printing instruction received from the user. Then, a printing command including the generated print data and another piece of data is transmitted to the recording apparatus. A receive buffer 410 retains, for example, print data transmitted from the host computer 490 to the present recording apparatus. For example, print data retained by the receive buffer 410 is transferred to a random access memory (RAM) 420 under the control of a central processing unit (CPU) 400 and is then temporarily stored therein. A read-only memory (ROM) 430 stores, for example, programs and fixed data required for various control operations for the recording apparatus. A non-volatile random access memory (NVRAM) 440 is a non-volatile memory for storing information which is to be stored even when the recording apparatus is powered off.

A head driver 450 is a driver for driving the recording head 100. A motor driver 460 is a driver for driving various motors 465, such as a carriage motor, a conveyance motor, a motor for moving up and down the cap 130, and a motor for causing the wiper 150 to perform reciprocal movement. A sensor controller 470 controls various sensors 475. A display unit/operation unit controller 480 controls a display unit/operation unit 485 of the recording apparatus. The CPU 400 performs various processing operations such as computation, control, determination, and setting, in conjunction with the RAM 420, the ROM 430, the NVRAM 440, and other units.

Here, multipass recording is described. The recording apparatus according to the present exemplary embodiment is what is called a serial scan type recording apparatus, and is configured to record an image by repetitively performing a recording operation, which causes the recording head 100 to perform reciprocal scanning in the main scanning direction, and a conveyance operation, which conveys a recording medium in the sub-scanning direction. Generally, a recording method in which a recorded image is completed by the recording head 100 performing main scanning once in the main scanning direction with respect to a unit region on a recording medium is called "one-pass recording", and a recording method in which a recorded image is completed by the recording head 100 performing main scanning a plurality of times in the main scanning direction with respect to a unit region on a recording medium is called "multipass recording". In multipass recording according to the present exemplary embodiment, a length shorter than a length in the sub-scanning direction of a region in which an image is recorded on a recording medium by the recording head 100 performing main scanning once is set as the amount of single conveyance of a recording medium. This enables making discharge ports for use in recording an image with respect to a unit region on a recording medium different with each main scanning performed a plurality of times. Therefore, the occurrence of density unevenness or streaks caused by variations of discharge characteristics of respective discharge ports is prevented or reduced. The number of times of main scanning performed with respect to a recording region on a recording medium in multipass recording is called the "number of passes". Increasing the number of passes enables more surely preventing or reducing the occurrence of density unevenness or streaks, but, on the other hand, makes a period of time required for recording of an image longer. Therefore, it is often the case that, in what is called a serial scan type recording apparatus, recording modes for about one-pass to sixteen-pass are prepared.

Figure 5:
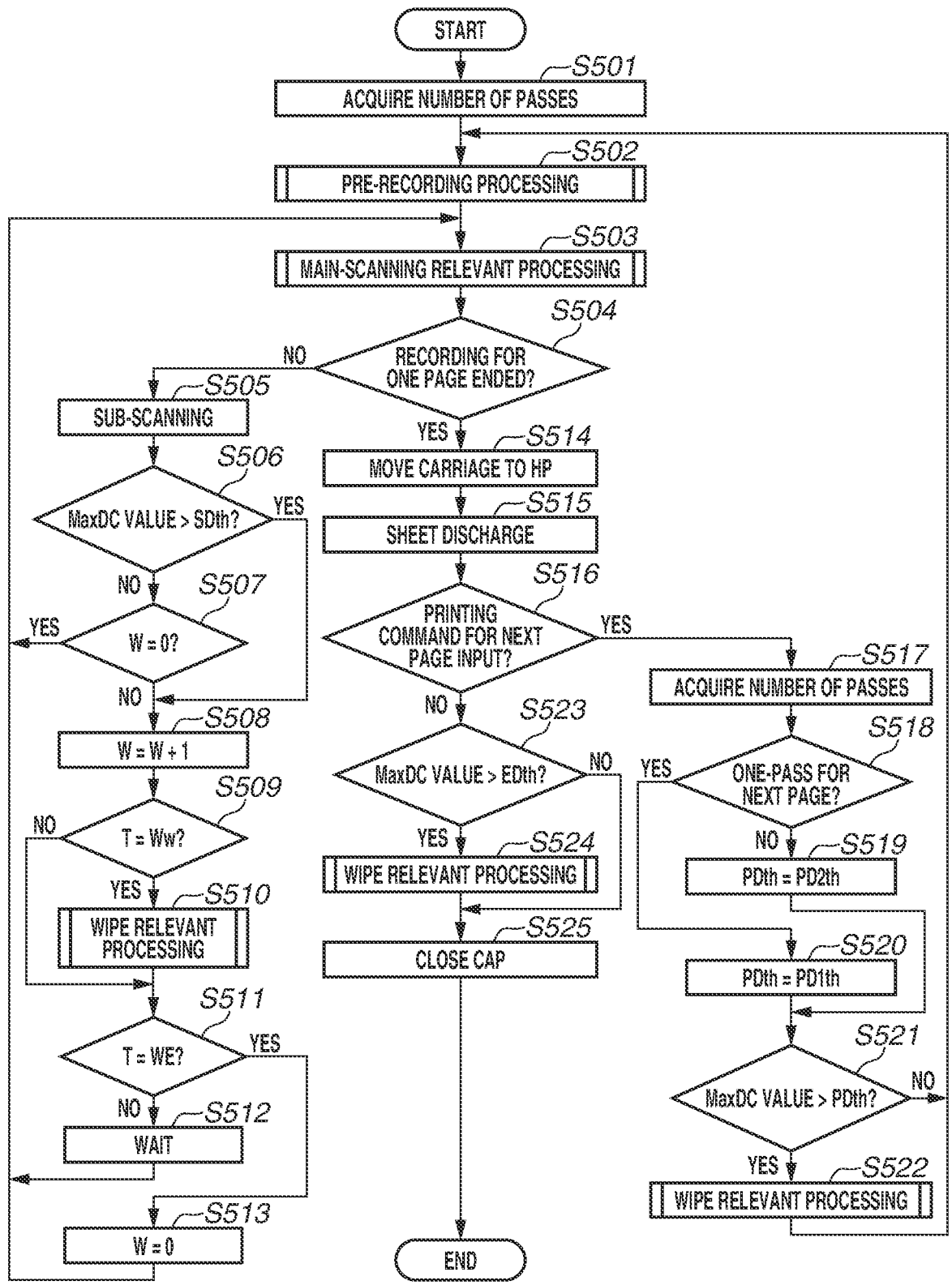
FIG. 5 is a flowchart illustrating a recording operation in a first exemplary embodiment.

Next, a recording operation of the recording apparatus according to the present exemplary embodiment is described with reference to FIG. 5 to FIGS. 11A, 11B, 11C, 11D, 11E, 11F, 11G, 11H, 11I, and 11J. FIG. 5 is a flowchart illustrating the recording operation in the present exemplary embodiment. Upon receiving, from the host computer 490, a printing command indicating an instruction for recording of an image, the control system of the present recording apparatus acquires recording mode data (recording mode information) included, together with print data and other pieces of information, in the printing command. The recording mode data includes information corresponding to "high-speed mode" or "high-quality image mode" designated by the user. In step S501, the CPU 400, which is included in the control system of the present recording apparatus, acquires data about the number of passes included in the recording mode data. In the following description, a case where the number of passes included in the acquired printing command corresponds to one-pass is described as an example.

Figure 6:
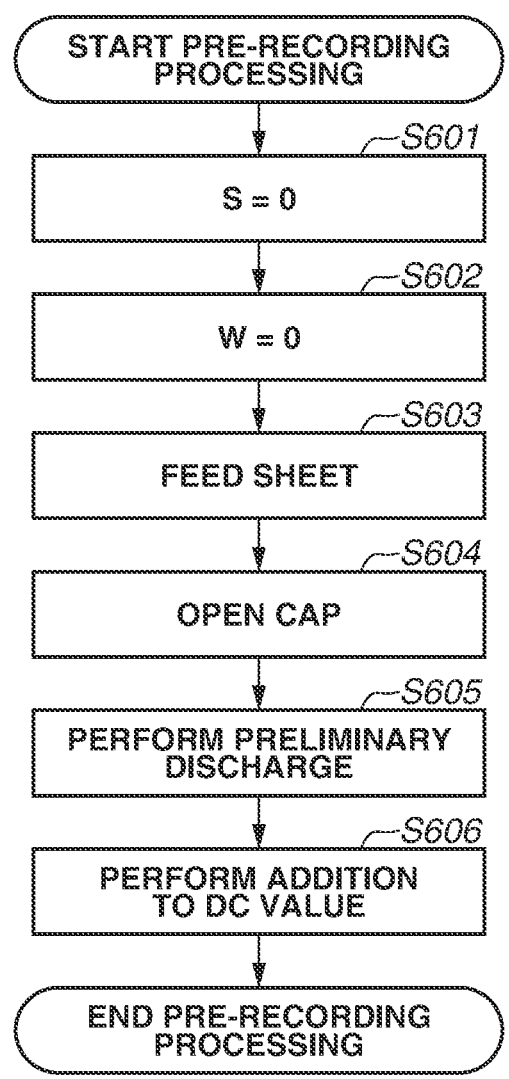
FIG. 6 is a flowchart illustrating pre-recording processing in the first exemplary embodiment.

After acquiring the number of passes in step S501, then in step S502, the CPU 400 performs pre-recording processing. FIG. 6 is a flowchart illustrating pre-recording processing, which is performed in step S502. First, in step S601, the CPU 400 resets the value of a counter S to "0". In step S602, the CPU 400 resets the value of a counter W to "0".

In step S603, the CPU 400 causes a known sheet feed and conveyance unit (not illustrated) to feed and convey a recording medium to a sheet feed completion position illustrated in FIG. 2. Furthermore, the maximum width (a length in the direction X1 or direction X2) of a recording medium which is allowed to be fed in the present recording apparatus is the short side length of paper size A2, i.e., 420 millimeters (mm). In an example of a recording operation described below, the size of a recording medium to be fed is the A2 size, and, on such a recording material, an image with a size slightly smaller than the A2 size both in the main scanning direction and the sub-scanning direction (hereinafter also referred to as an "image with a size slightly smaller than the A2 size" is recorded.

In step S604, the CPU 400 causes the cap 130 to move from the capping position to the separation position. In step S605, the CPU 400 causes the recording head 100 to perform preliminary discharge. The preliminary discharge is performed by causing ink to be discharged from the discharge ports of the recording head 100 toward the ink absorber inside the cap 130. The preliminary discharge is performed to prevent or reduce clogging of the discharge ports caused by a solvent included in ink present near the discharge ports being evaporated to condense and thicken the ink, and is performed to prevent the condensed ink from being used for recording of an image. Ink discharged to the ink absorber by preliminary discharge is ejected into a maintenance cartridge (not illustrated) via the waste ink tube 133 by driving of the suction pump 132 at appropriate timing.

In step S606, the CPU 400 counts the number of ink droplets discharged from each discharge port array of the recording head 100, and adds the counted number for each discharge port array to the value of a dot counter (DC) provided for each discharge port array. This processing is described in detail below.

As mentioned above, an electro-thermal conversion member, which serves as a recording element for generating energy for discharging ink, is provided inside each discharge port of the recording head 100 in the present exemplary embodiment. In response to a voltage being applied to the electro-thermal conversion member, a bubble is generated in ink present in the discharge port, so that, due to a pressure of the bubble, an ink droplet is discharged from the discharge port. The voltage to be applied to each electro-thermal conversion member is a voltage that is based on a lump of electrical signals designed such that one ink droplet discharged from each discharge port forms one dot on a recording medium. Such a lump of electrical signals is hereinafter also referred to as a "driving pulse". In the present exemplary embodiment, the CPU 400 counts the number of driving pulses each corresponding to a discharge operation performed once, as the number of discharged ink droplets. Accordingly, in step S606, the total number of driving pulses applied to the electro-thermal conversion members provided in 1,200 discharge ports belonging to each discharge port array of the recording head 100 is added to the value of the dot counter corresponding to each discharge port array.

Furthermore, when a voltage is applied to an electro-thermal conversion member provided in each discharge port, in addition to an ink droplet large in volume called a main droplet impacting the surface of a recording medium, a plurality of ink droplets small in volume called mists is discharged. Some of the mists do not impact the surface of a recording medium, but adhere to the discharge port surface 102 of the recording head 100. Along with discharge operations for a huge number of ink droplets, a large number of mists accumulated on the discharge port surface 102 become a lump of ink. The lump of ink deflects the discharge direction of main droplets and, in addition, hinders discharging of main droplets, thus also causing non-discharging. To cope with this issue, in the present exemplary embodiment, the CPU 400 estimates the amount of ink accumulated on the discharge port surface 102 with use of the counted value obtained by counting the number of ink droplets discharged from each discharge port array, and uses the estimated amount of accumulated ink for, for example, an invocation trigger for a recovery operation described below. After performing step S606, the CPU 400 ends the pre-recording processing illustrated in FIG. 6, and then advances the processing to main-scanning relevant processing in step S503.

Figure 7:
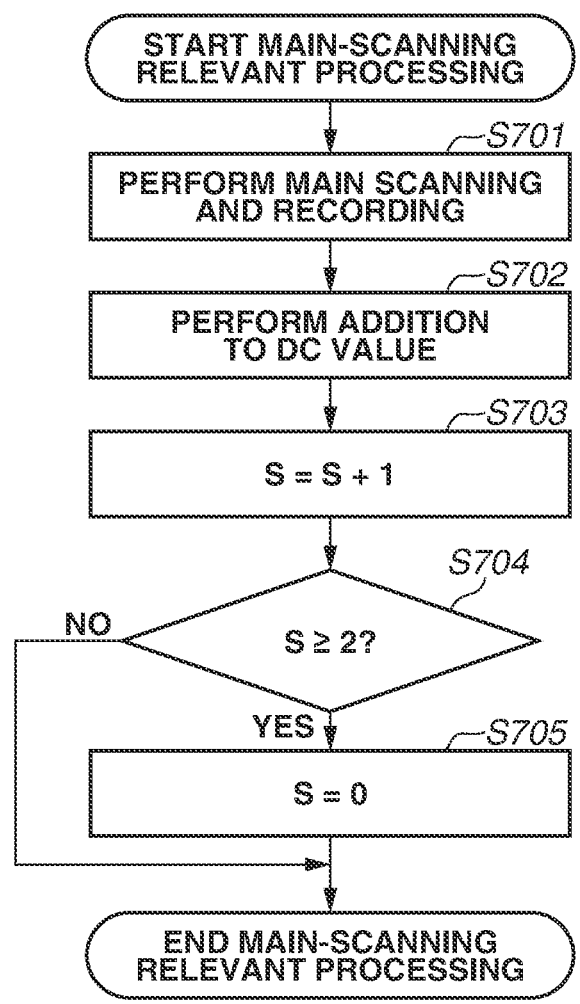
FIG. 7 is a flowchart illustrating main-scanning relevant processing in the first exemplary embodiment.
Figure 10A:
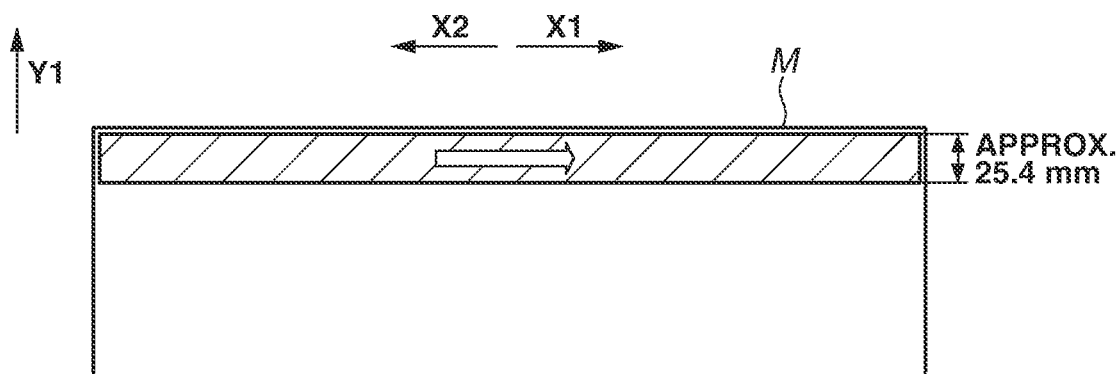
FIGS. 10A and 10B are diagrams illustrating a recording operation for one-pass mode in the first exemplary embodiment.

FIG. 7 is a flowchart illustrating the details of main-scanning relevant processing in step S503. First, in step S701, the CPU 400 causes the carriage 111 to perform main scanning in the direction X1 (hereinafter also referred to as a "forward direction") and, at the same time, causes ink to be discharged from discharge ports during the main scanning, thus recording an image on a recording medium. In this occasion, the length in the direction Y1 of a recording region subjected to recording on a recording medium is approximately 1 inch=approximately 25.4 mm. FIG. 10A is a plan view schematically illustrating a recording medium M in the above-mentioned state.

After performing step S701, then in step S702, the CPU 400 performs count processing similar to that performed in step S606. The number of ink droplets discharged at the time of the recording operation in step S701 is counted for each discharge port array, and the counted value for each discharge port array is added to the value of the corresponding dot counter.

Next, in step S703, the CPU 400 increments the value of the counter S. Since the initial value of the counter S is "0", the value of the counter S obtained by the processing performed in step S703 is "1".

In step S704, the CPU 400 determines whether the value of the counter S is greater than or equal to "2". At this time, since the value of the counter S is "1", the result of determination is "no". If the result of determination is "no" (NO in step S704), the CPU 400 skips step S705 and then ends the main-scanning relevant processing.

Referring back to FIG. 5, in step S504, the CPU 400 determines whether recording of an image on a recording medium for one page has been ended by the recording operation performed in step S701. While the present recording operation example is an example in which an image with a size slightly smaller than the A2 size is recorded, the length in the sub-scanning direction of an image recorded in this stage is only approximately 25.4 mm. Accordingly, since the result of determination in step S504 is "no" (NO in step S504), the CPU 400 advances the processing to step S505.

In step S505, the CPU 400 causes the recording medium to be conveyed in the direction Y1. Hereinafter, such conveyance of a recording medium is also referred to as "sub-scanning". Since the number of passes in a recording mode in the present recording operation example corresponds to one-pass, the amount of conveyance is 25.4 mm, which is equal to the length in the sub-scanning direction of a recording region subjected to recording on a recording medium in step S701.

In step S506, the CPU 400 determines whether to perform a recovery operation between main scanning operations. Here, if the MaxDC value, which is the maximum value of dot count values corresponding to the respective discharge port arrays, exceeds an intra-page threshold value SDth, the CPU 400 determines to perform wiping, which is one type of recovery operation. As mentioned above, along with discharging operations for ink, ink is progressively accumulated on the discharge port surface 102 due to, for example, mists adhering to the discharge port surface 102. When the accumulated ink becomes a large lump, for example, defective discharge occurs. To cope with this issue, the intra-page threshold value SDth is set to a value determined in consideration of the risk of occurrence of, for example, defective discharge caused by the accumulated ink. In the present exemplary embodiment, the intra-page threshold value SDth is "1,100,000,000, i.e., $1.1 \times 10$ to the ninth power.

Furthermore, in a case where the MaxDC value obtained before preliminary discharge in step S605 is performed is a value less than or equal to a second inter-page threshold value PD2th described below, the intra-page threshold value SDth is set to a value which the MaxDC value is not able to reach in the process of recording of an image with a size slightly smaller than the A2 size for one page. The recording apparatus in the present exemplary embodiment is able to record an image with a maximum size slightly smaller than the A2 size as a fixed size. Accordingly, if the MaxDC value obtained before recording is a value less than or equal to the second inter-page threshold value PD2th described below, the MaxDC value does not exceed the intra-page threshold value SDth in the process of recording for one page. Thus, if the MaxDC value obtained before recording is a value less than or equal to the second inter-page threshold value PD2th described below, wiping between main scanning operations is not performed in the process of recording on a fixed-size recording medium for one page.

However, as mentioned above, the maximum width in the main scanning direction of a recording medium which is allowed to be fed in the recording apparatus in the present exemplary embodiment is the short side length of the A2 size (420 mm). On the other hand, the length in the sub-scanning direction of a recording medium which is allowed to be fed is not the long side length of the A2 size (594 mm) but a length larger than that. When what is called banner recording, in which the length in the sub-scanning direction is long, is performed, even if the MaxDC value obtained before recording is a value less than or equal to the second inter-page threshold value PD2th described below, wiping may be, in some cases, performed in the process of recording of an image for one page.

Here, a case where the result of determination in step S506 is "no", i.e., the MaxDC value does not exceed the intra-page threshold value SDth, is described. If the result of determination in step S506 is "no" (NO in step S506), then in step S507, the CPU 400 determines whether the value of the counter W is "0". Since the value of the counter W at this time is "0", the result of determination in step S507 is "yes" (YES in step S507), so that the CPU 400 returns the processing to the main-scanning relevant processing in step S503.

Figure 10B:
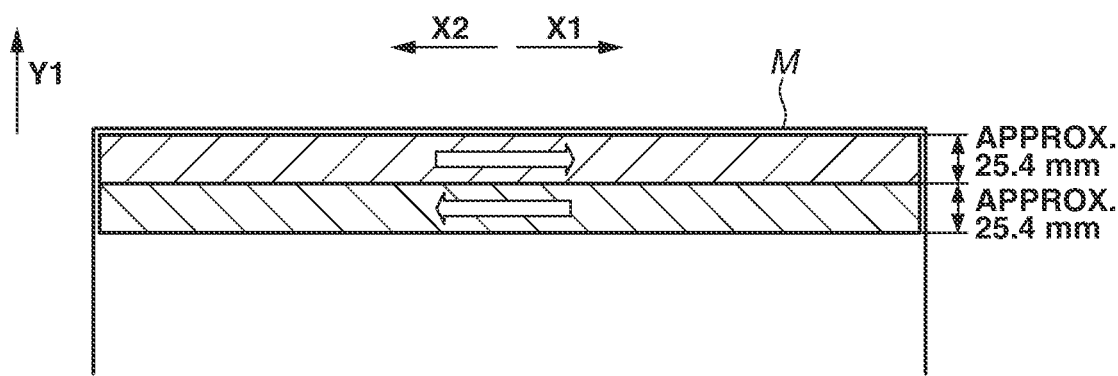

The main-scanning relevant processing to be performed here is basically similar to the main-scanning relevant processing performed last time. In step S701 illustrated in FIG. 7, the CPU 400 causes the carriage 111 to perform main scanning in the direction X2 (hereinafter also referred to as a "backward direction"), and causes ink to be discharged from discharge ports of the recording head 100 during main scanning, thus recording an image. In this occasion, the length in the sub-scanning direction of a recording region subjected to recording on a recording medium is approximately 1 inch=approximately 25.4 mm. FIG. 10B is a plan view schematically illustrating a recording medium M in the above-mentioned state.

In step S702, the CPU 400 performs addition to the dot count value again. Here, the number of ink droplets discharged at the time of the recording operation in step S701 is counted for each discharge port array, and the counted value for each discharge port array is added to the value of the corresponding dot counter.

Next, in step S703, the CPU 400 increments the value of the counter S. Since the value of the counter S here is "1", the value of the counter S obtained by performing the processing in step S703 is "2".

In step S704, the CPU 400 determines whether the value of the counter S is greater than or equal to "2". Since the value of the counter S at this time is "2", the result of determination in step S704 is "yes" (YES in step S704), so that the CPU 400 advances the processing to step S705.

In step S705, the CPU 400 resets the value of the counter S to "0". The value of the counter S represents a position at which the carriage 111 stops after an operation for main scanning and recording during that in step S701. The value of the counter S being "0" indicates that the carriage 111 is at a stop on the side X2 where the cap 130 and the wiper 150 are provided (hereinafter also referred to as the "home position (HP) side"). On the other hand, the value of the counter S being "1" indicates that the carriage 111 is at a stop on the side X1 (hereinafter also referred to as the "back position (BP) side"). After performing step S705, the CPU 400 ends the main-scanning relevant processing illustrated in the flowchart of FIG. 7 and then advances the processing to step S504.

Referring back to FIG. 5, in step S504, the CPU 400 determines whether recording of an image on a recording medium for one page has been ended by the recording operation performed in step S701. At this time, while an image with a size slightly smaller than the A2 size is being recorded, the length in the sub-scanning direction of an image recorded in this stage is approximately 25.4 mm×2=approximately 50.8 mm. Accordingly, since the result of determination in step S504 is "no" (NO in step S504), the CPU 400 advances the processing to step S505 again.

In step S505, the CPU 400 causes the recording medium to be conveyed in the direction Y1. The amount of conveyance performed at this time is approximately 25.4 mm, which is equal to the length in the sub-scanning direction of a recording region subjected to recording on the recording medium in step S701.

In step S506, the CPU 400 determines whether the MaxDC value exceeds the intra-page threshold value SDth. If the result of determination in step S506 is "no" (NO in step S506), the 400 advances the processing to step S507. As mentioned above, in a case where the MaxDC value obtained before recording of an image with a size slightly smaller than the A2 size is a value less than or equal to the second inter-page threshold value PD2th described below, the result of determination in step S506 does not become "yes".

In step S507, the CPU 400 determines whether the value of the counter W is "0". Since the value of the counter W here is "0", the result of determination in step S507 is "yes" (YES in step S507), so that the CPU 400 returns the processing to step S503 again.

Here, in a case where the MaxDC value obtained before recording is a value less than or equal to the second inter-page threshold value PD2th, the CPU 400 repeats the above-described processing in step S503 to step S507 until the result of determination in step S504 becomes "yes". After recording of an image for one page has ended (YES in step S504), the CPU 400 advances the processing to step S514. Processing operations in step S514 and subsequent steps are described below.

On the other hand, if the MaxDC value obtained before recording of an image is a value exceeding the second inter-page threshold value PD2th, in some cases, the MaxDC value exceeds the intra-page threshold value SDth during recording of an image for one page with a size slightly smaller than the A2 size, so that the result of determination in step S506 may become "yes" (YES in step S506). In that case, the CPU 400 advances the processing to step S508 to increment the value of the counter W. Since the value of the counter W here is "0", the value of the counter W obtained by performing the processing in step S508 is "1".

In step S509, the CPU 400 determines whether an operation trigger T is "Ww". FIG. 9 is a diagram illustrating a relationship between the number of passes, the value of the counter W, the value of the counter S, the operation trigger T, and a wait. For example, in a case where, in recording in main scanning in the forward direction, the MaxDC value has exceeded the intra-page threshold value SDth, the value of the counter S becomes "1". Since, in a recording mode of the present recording operation example, the number of passes is "1" and the value of the counter W is "1", the column for the operation trigger T illustrated in FIG. 9 is blank. Since the column for the operation trigger T illustrated in FIG. 9 is blank, i.e., the operation trigger T is not "Ww", the result of determination in step S509 is "no" (NO in step S509).

In step S511, the CPU 400 determines whether the operation trigger T is "WE". The present recording operation example corresponds to a recording mode of one-pass, W=1, and S=1, and, as mentioned above, the column for the operation trigger T illustrated in FIG. 9 is blank. Therefore, the result of determination in step S511 is "no" (NO in step S511).

In step S512, the CPU 400 performs a waiting operation (wait). A wait time at this time (in the recording mode of one-pass, W=1, and S=1) is 0 seconds as illustrated in FIG. 9. Therefore, without performing a waiting operation (wait), the CPU 400 returns the processing to the main-scanning relevant processing in step S503.

In the main-scanning relevant processing, in step S701 illustrated in FIG. 7, the CPU 400 causes the carriage 111 to perform main scanning in the backward direction and causes ink to be discharged during that, thus recording an image. In step S702, the CPU 400 performs addition to the dot count value in association with the recording operation. In step S703 to step S705, the CPU 400 updates the value of the counter S to "0" and then ends the main-scanning relevant processing.

Referring back to FIG. 5, in step S504, the CPU 400 determines whether recording of an image for one page has been ended by the recording operation performed in step S701. If the result of determination in step S504 is "yes" (YES in step S504), the CPU 400 advances the processing to step S514. On the other hand, if the result of determination in step S504 is "no" (NO in step S504), i.e., in a case where, even when the recording operation in step S701 has been performed, recording for that page has not yet ended, the CPU 400 advances the processing to step S505 to perform sub-scanning similar to that described above. The amount of conveyance performed at this time is approximately 25.4 mm, which is equal to the length in the sub-scanning direction of a recording region subjected to recording on the recording medium in step S701.

In step S506, the CPU 400 determines whether the MaxDC value exceeds the intra-page threshold value SDth. The MaxDC value here is a value obtained by adding the dot count value obtained in step S702 to a value about which the result of determination in step S506 performed last time is "yes", i.e., a value exceeding the intra-page threshold value SDth. Accordingly, the result of determination in step S506 at this time is "yes" (YES in step S506), so that the CPU 400 advances the processing to step S508.

In step S508, the CPU 400 increments the value of the counter W. Since the value of the counter W here is "1", the value of the counter W obtained by performing the processing in step S508 is "2".

In step S509, the CPU 400 determines whether the operation trigger T is "Ww". At this time (one-pass, W=2, and S=0), the column for the operation trigger T illustrated in FIG. 9 indicates "Ww". Accordingly, the result of determination in step S509 is "yes" (YES in step S509), so that the CPU 400 advances the processing to wipe relevant processing in step S510.

Figure 8:
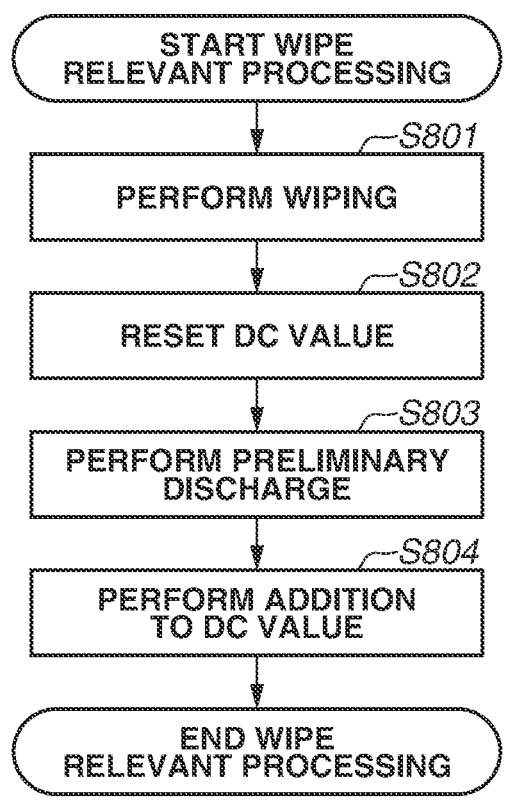
FIG. 8 is a flowchart illustrating wiping relevant processing in the first exemplary embodiment.

FIG. 8 is a flowchart illustrating wipe relevant processing. First, in step S801, the CPU 400 causes the above-described wiping to be performed, so that, for example, unnecessary ink or dust adhering to the discharge port surface 102 of the recording head 100 is swept away. Then, in step S802, the CPU 400 resets the value of each dot counter corresponding to each discharge port array to "0". In step S803, the CPU 400 causes the recording head 100 to perform preliminary discharge. There is a possibility that, due to wiping performed in step S801, ink adhering to the discharge port surface 102 may be pushed into discharge ports by wiping. Therefore, preliminary discharge is performed to prevent the pushed-in ink from being used for a recording operation of an image to be performed next. In step S804, the CPU 400 performs addition to the count value in association with preliminary discharge performed in step S803, and then ends the wipe relevant processing. Furthermore, while the discharge performance of the recording head 100 is maintained or recovered by the wipe relevant processing, a time of about 15 seconds is required to perform the wipe relevant processing.

After performing the wipe relevant processing, the CPU 400 advances the processing to step S511 to determine whether the operation trigger T is "WE". At this time (one-pass, W=2, and S=0), the column for the operation trigger T illustrated in FIG. 9 indicates "Ww" as mentioned above and does not indicate "WE". Accordingly, the result of determination in step S511 is "no" (NO in step S511), so that the CPU 400 advances the processing to step S512.

In step S512, the CPU 400 performs a waiting operation (wait). A wait time at this time (one-pass, W=2, and S=0) is 0 seconds as illustrated in FIG. 9. Therefore, without performing a waiting operation (wait), the CPU 400 returns the processing to the main-scanning relevant processing in step S503.

In the main-scanning relevant processing, in step S701 illustrated in FIG. 7, the CPU 400 causes the carriage 111 to perform main scanning in the forward direction and causes ink to be discharged during that, thus recording an image. In step S702, the CPU 400 performs addition to the dot count value in association with the recording operation. In step S703 to step S704, the CPU 400 updates the value of the counter S to "1" and then ends the main-scanning relevant processing.

Referring back to FIG. 5, in step S504, the CPU 400 determines whether recording of an image for one page has been ended by the recording operation performed in step S701. If the result of determination in step S504 is "yes" (YES in step S504), the CPU 400 advances the processing to step S514. On the other hand, if the result of determination in step S504 is "no" (NO in step S504), i.e., in a case where, even when the recording operation in step S701 has been performed, recording for that page has not yet ended, the CPU 400 advances the processing to step S505 to perform sub-scanning. The amount of conveyance performed at this time is approximately 25.4 mm, which is equal to the length in the sub-scanning direction of a recording region subjected to recording on the recording medium in step S701.

In step S506, the CPU 400 determines whether the MaxDC value exceeds the intra-page threshold value SDth. The MaxDC value here is a value obtained by adding, in step S804, the dot count value to a value reset to "0" in step S802. Since this value is a value of about 1×10 to the sixth power, the result of determination in step S506 is "no" (NO in step S506), so that the CPU 400 advances the processing to step S507.

In step S507, the CPU 400 determines whether the value of the counter W is "0". Since the value of the counter W at this time is "2", the result of determination in step S507 is "no" (NO in step S507).

In step S508, the CPU 400 increments the value of the counter W. Since the value of the counter W here is "2", the value of the counter W obtained by performing the processing in step S508 is "3".

In step S509, the CPU 400 determines whether the operation trigger T is "Ww". Since, at this time (one-pass, W=3, and S=1), the column for the operation trigger T illustrated in FIG. 9 indicates "WE" and does not indicate "Ww", the result of determination in step S509 is "no" (NO in step S509), so that the CPU 400 advances the processing to step S511.

In step S511, the CPU 400 determines whether the operation trigger T is "WE". Since, at this time (one-pass, W=3, and S=1), the column for the operation trigger T illustrated in FIG. 9 indicates "WE", the result of determination in step S511 is "yes" (YES in step S511), the CPU 400 advances the processing to step S513.

In step S513, the CPU 400 resets the value of the counter W to "0", and then returns the processing to the main-scanning relevant processing in step S503 again. After that, the CPU 400 repeats the processing in step S503 to step S507 until the result of determination in step S504 becomes "yes". After image recording for one page has ended (YES in step S504), the CPU 400 advances the processing to step S514.

On the other hand, if the MaxDC value exceeds the intra-page threshold value SDth due to recording in main scanning in the backward direction, the result of determination in step S506 is "yes" (YES in step S506). In this case, the CPU 400 advances the processing to step S508 to increment the value of the counter W to "1".

In step S509, the CPU 400 determines whether the operation trigger T is "Ww". At this time, since the number of passes is "1", the value of the counter W is "1", and the value of the counter S is "0", the column for the operation trigger T illustrated in FIG. 9 indicates "Ww". Accordingly, the result of determination in step S509 is "yes" (YES in step S509), so that the CPU 400 advances the processing to step S510 to perform the above-described wipe relevant processing.

After performing the wipe relevant processing, then in step S511, the CPU 400 determines whether the operation trigger T is "WE". Since the column for the operation trigger T illustrated in FIG. 9 at this time (one-pass, W=1, and S=0) indicates "Ww" and does not indicate "WE", the result of determination in step S511 is "no" (NO in step S511).

In step S512, the CPU 400 performs a waiting operation (wait). Since a wait time at this time (one-pass, W=1, and S=0) is 0 seconds as illustrated in FIG. 9, without performing a waiting operation (wait), the CPU 400 returns the processing to the main-scanning relevant processing in step S503 again.

In the main-scanning relevant processing at this time (one-pass, W=1, and S=0), in step S701 illustrated in FIG. 7, the CPU 400 causes the carriage 111 to perform main scanning in the forward direction and causes ink to be discharged during that scanning, thus recording an image. In step S702, the CPU 400 performs addition to the dot count value in association with the recording operation. In step S703 to step S704, the CPU 400 updates the value of the counter S to "1" and then ends the main-scanning relevant processing.

Referring back to FIG. 5, in step S504, the CPU 400 determines whether recording of an image for one page has been ended by the recording operation performed in step S701, and, if the result of determination in step S504 is "yes" (YES in step S504), the CPU 400 advances the processing to step S514. On the other hand, if the result of determination in step S504 is "no" (NO in step S504), i.e., in a case where, even when the recording operation in step S701 has been performed, recording for that page has not yet ended, the CPU 400 advances the processing to step S505 to perform sub-scanning. The amount of conveyance performed at this time is approximately 25.4 mm, which is equal to the length in the sub-scanning direction of a recording region subjected to recording on the recording medium in step S701.

In step S506, the CPU 400 determines whether the MaxDC value exceeds the intra-page threshold value SDth. The MaxDC value at this time is a value obtained by adding, in step S804, the dot count value to a value reset to "0" in step S802. Since this value is a value of about 1×10 to the sixth power, the result of determination in step S506 is "no" (NO in step S506).

In step S507, the CPU 400 determines whether the value of the counter W is "0", and, since the value of the counter W at this time is "1", the result of determination in step S507 is "no" (NO in step S507). In step S508, the CPU 400 increments the value of the counter W. Since the value of the counter W at this time is "1", the value of the counter W obtained by performing the processing in step S508 is "2".

In step S509, the CPU 400 determines whether the operation trigger T is "Ww". At this time (one-pass, W=2, and S=1), since the column for the operation trigger T illustrated in FIG. 9 indicates "WE" and does not indicate "Ww", the result of determination in step S509 is "no" (NO in step S509).

In step S511, the CPU 400 determines whether the operation trigger T is "WE". Since, at this time (one-pass, W=2, and S=1), the column for the operation trigger T illustrated in FIG. 9 indicates "WE", the result of determination in step S511 is "yes" (YES in step S511).

In step S513, the CPU 400 resets the value of the counter W to "0", and then returns the processing to the main-scanning relevant processing in step S503 again.

After that, as mentioned above, the CPU 400 repeats the processing in step S503 to step S507 until the result of determination in step S504 becomes "yes". After image recording for one page has ended (YES in step S504), the CPU 400 advances the processing to step S514.

Performing the above-described control causes wipe relevant processing, which is performed between main scanning operations, to be performed after main scanning in the backward direction of the carriage 111, thus causing no movement in the backward direction of the carriage 111 performed only for wipe relevant processing.

Here, an image defect caused by a time difference occurring at the time of multipass recording is described. In multipass recording, in the process of ink discharged in a given main scanning operation forming a dot while spreading and drying on a recording medium, ink discharged in a next main scanning operation impacts approximately the same position and becomes mixed with ink discharged in the given main scanning operation. At this time, the degree of mixture of ink varies with an impact time difference, i.e., a time difference between main scanning operations. Accordingly, unless a time difference between respective main scanning operations is constant, a difference occurs in the degree of mixture of inks discharged in successive two main scanning operations, so that image unevenness may occur.

On the other hand, in one-pass recording, inks discharged in successive two main scanning operations do not become mixed with each other on a recording medium. Therefore, even if a time difference between respective main scanning operations is not constant, an image defect does not occur.

Such a time difference between main scanning operations in multipass recording varies depending on whether to perform wiping processing. A time difference between successive two main scanning operations in the case of performing wiping processing is longer than a time difference between successive two main scanning operations in the case of not performing wiping processing. Therefore, in the case of performing multipass recording, image unevenness may occur due to a time difference caused by wiping processing being performed.

FIG. 9 is a diagram also illustrating wait control in a multipass, e.g., four-pass, recording mode in the present exemplary embodiment. Wait control illustrated in FIG. 9 is performed between subsequent main scanning operations for wipe relevant processing requiring a time of about 15 seconds.

In the following description, a case where wiping is performed between main scanning operations at the time of four-pass mode is described with reference to an example of a recording operation performed when the MaxDC value has exceeded the intra-page threshold value SDth due to recording in main scanning in the backward direction.

Figure 11A:
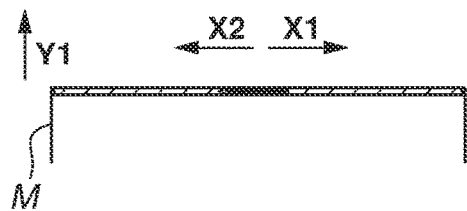
FIGS. 11A, 11B, 11C, 11D, 11E, 11F, 11G, 11H, 11I, and 11J are diagrams illustrating a recording operation for four-pass mode in the first exemplary embodiment.

Because of a case where the MaxDC value has exceeded the intra-page threshold value SDth due to recording in main scanning in the backward direction, the result of determination in step S506 illustrated in FIG. 5 is "yes" (YES in step S506), so that the CPU 400 advances the processing to step S508. Then, in step S508, the CPU 400 increments the value of the counter W to "1". Furthermore, because of a case where the MaxDC value has exceeded the intra-page threshold value SDth due to recording in main scanning in the backward direction, the value of the counter S is "0". Moreover, FIG. 11A is a plan view schematically illustrating a recording medium M at this time.

In step S509, the CPU 400 determines whether the operation trigger T is "Ww". At this time, since the number of passes is "4", the value of the counter W is "1", and the value of the counter S is "0", the column for the operation trigger T illustrated in FIG. 9 is blank and does not indicate "Ww". Accordingly, the result of determination in step S509 is "no" (NO in step S509).

In step S511, the CPU 400 determines whether the operation trigger T is "WE". Since, at this time (four-pass, W=1, and S=0), the column for the operation trigger T illustrated in FIG. 9 is blank as mentioned above, the result of determination in step S511 is "no" (NO in step S511).

In step S512, the CPU 400 performs a waiting operation (wait). A wait time at this time (four-pass, W=1, and S=0) is 1 second as illustrated in FIG. 9. Therefore, after waiting for 1 second, the CPU 400 returns the processing to the main-scanning relevant processing in step S503.

Figure 11B:
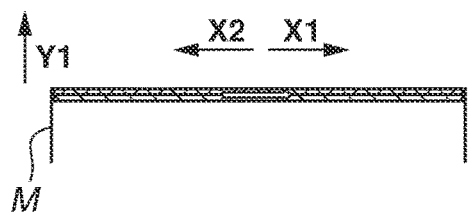

The main-scanning relevant processing to be performed at this time (four-pass, W=1, and S=0) is basically similar to the above-described main-scanning relevant processing. In step S701 illustrated in FIG. 7, the CPU 400 causes the carriage 111 to perform main scanning in the forward direction, and causes ink to be discharged during that time, thus recording an image. FIG. 11B is a plan view schematically illustrating the recording medium M at this time. In step S702, the CPU 400 performs addition to the dot count value. In step S703 to step S704, the CPU 400 updates the value of the counter S to "1" and then ends the main-scanning relevant processing.

Referring back to FIG. 5, in step S504, the CPU 400 determines whether recording of an image for one page has been ended by the recording operation performed in step S701, and, if the result of determination in step S504 is "yes" (YES in step S504), the CPU 400 advances the processing to step S514.

On the other hand, if the result of determination in step S504 is "no" (NO in step S504), i.e., in a case where, even when the recording operation in step S701 has been performed, recording for that page has not yet ended, the CPU 400 advances the processing to step S505 to perform sub-scanning. Furthermore, the amount of conveyance of a recording medium performed at this time (at the time of four-pass) is one-fourth of the length in the sub-scanning direction of a recording region subjected to recording on the recording medium in step S701, i.e., approximately 25.4 mm×¼=approximately 6.35 mm.

After performing step S505, the CPU 400 advances the processing to step S506 to determine whether the MaxDC value exceeds the intra-page threshold value SDth. The MaxDC value here is a value obtained by further adding the dot count value obtained in step S702 to a value about which the result of determination in step S506 performed last time is "yes", i.e., a value exceeding the intra-page threshold value SDth. Accordingly, since the MaxDC value exceeds the intra-page threshold value SDth, the result of determination in step S506 is "yes" (YES in step S506), so that the CPU 400 advances the processing to step S508. In step S508, the CPU 400 increments the value of the counter W to "2".

While, after performing step S508, the CPU 400 advances the processing to step S509 and subsequent steps, since, at this time, the number of passes is "4", the value of the counter W is "2", and the value of the counter S is "1", the column for the operation trigger T illustrated in FIG. 9 is blank and a wait time is 2 seconds. Accordingly, the result of determination in step S509 is "no" (NO in step S509) and the result of determination in step S511 is also "no" (NO in step S511). After waiting for 2 seconds in step S512, the CPU 400 returns the processing to step S503, i.e., the main-scanning relevant processing.

Figure 11C:
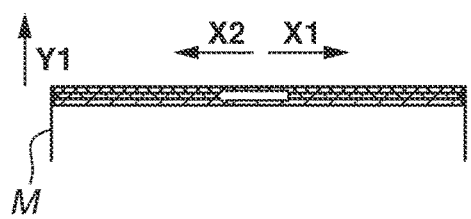

The main-scanning relevant processing to be performed at this time (four-pass, W=2, and S=1) is basically similar to the above-described main-scanning relevant processing. In step S701 illustrated in FIG. 7, the CPU 400 causes the carriage 111 to perform main scanning in the backward direction, and causes ink to be discharged during that time, thus recording an image. FIG. 11C is a plan view schematically illustrating the recording medium M at this time. In step S702, the CPU 400 performs addition to the dot count value. In step S703 to step S705, the CPU 400 updates the value of the counter S to "0" and then ends the main-scanning relevant processing.

Referring back to FIG. 5, in step S504, the CPU 400 determines whether recording of an image for one page has been ended by the recording operation performed in step S701, and, if the result of determination in step S504 is "yes" (YES in step S504), the CPU 400 advances the processing to step S514.

On the other hand, if the result of determination in step S504 is "no" (NO in step S504), i.e., in a case where, even when the recording operation in step S701 has been performed, recording for that page has not yet ended, the CPU 400 advances the processing to step S505 to perform sub-scanning. The amount of conveyance performed at this time is one-fourth of the length in the sub-scanning direction of a recording region subjected to recording on the recording medium in step S701, i.e., approximately 6.35 mm.

After performing step S505, the CPU 400 advances the processing to step S506 to determine whether the MaxDC value exceeds the intra-page threshold value SDth. The MaxDC value here is a value obtained by further adding the dot count value obtained in step S702 to a value about which the result of determination in step S506 performed last time is "yes", i.e., a value exceeding the intra-page threshold value SDth. Accordingly, since the MaxDC value exceeds the intra-page threshold value SDth, the result of determination in step S506 is "yes" (YES in step S506), so that the CPU 400 advances the processing to step S508.

Then, in step S508, the CPU 400 increments the value of the counter W to "3". At this time (four-pass, W=3, and S=0), the column for the operation trigger T illustrated in FIG. 9 is blank and a wait time is 4 seconds. Accordingly, the result of determination in step S509 is "no" (NO in step S509) and the result of determination in step S511 is also "no" (NO in step S511). After waiting for 4 seconds in step S512, the CPU 400 returns the processing to step S503, i.e., the main-scanning relevant processing.

Figure 11D:
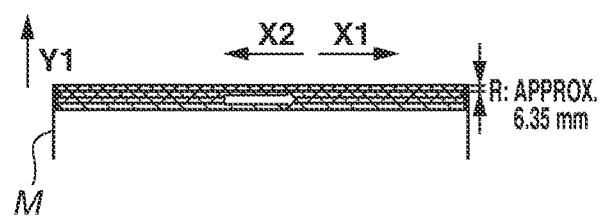

The main-scanning relevant processing to be performed at this time (four-pass, W=3, and S=0) is basically similar to the above-described main-scanning relevant processing. In step S701 illustrated in FIG. 7, the CPU 400 causes the carriage 111 to perform main scanning in the forward direction, and causes ink to be discharged during that time, thus recording an image. FIG. 11D is a plan view schematically illustrating the recording medium M at this time. In FIG. 11D, a portion indicated by "R" represents a portion in which an image is completed by recording in main scanning performed four times. Such multipass recording, which causes the recording head 100 to perform main scanning four times with respect to a predetermined region on a recording medium and forms dots by inks discharged from discharge ports varying for respective main scanning operations, enables preventing or reducing the occurrence of density unevenness or streaks in a recorded image.

Then, in step S702, the CPU 400 performs addition to the dot count value. In step S703 to step S704, the CPU 400 updates the value of the counter S to "1" and then ends the main-scanning relevant processing.

Referring back to FIG. 5, in step S504, the CPU 400 determines whether recording of an image for one page has been ended by the recording operation performed in step S701, and, if the result of determination in step S504 is "yes" (YES in step S504), the CPU 400 advances the processing to step S514.

On the other hand, if the result of determination in step S504 is "no" (NO in step S504), i.e., in a case where, even when the recording operation in step S701 has been performed, recording for that page has not yet ended, the CPU 400 advances the processing to step S505 to perform sub-scanning. The amount of conveyance performed at this time is one-fourth of the length in the sub-scanning direction of a recording region subjected to recording on the recording medium in step S701, i.e., approximately 6.35 mm.

After performing step S505, the CPU 400 advances the processing to step S506 to determine whether the MaxDC value exceeds the intra-page threshold value SDth. The MaxDC value here is a value obtained by adding the dot count value obtained in step S702 to a value about which the result of determination in step S506 performed last time is "yes", i.e., a value exceeding the intra-page threshold value SDth. Accordingly, since the MaxDC value exceeds the intra-page threshold value SDth, the result of determination in step S506 is "yes" (YES in step S506), so that the CPU 400 advances the processing to step S508.

Then, in step S508, the CPU 400 increments the value of the counter W to "4". At this time (four-pass, W=4, and S=1), the column for the operation trigger T illustrated in FIG. 9 is blank and a wait time is 8 seconds. Accordingly, the result of determination in step S509 is "no" (NO in step S509) and the result of determination in step S511 is also "no" (NO in step S511). After waiting for 8 seconds in step S512, the CPU 400 returns the processing to step S503, i.e., the main-scanning relevant processing.

Figure 11E:
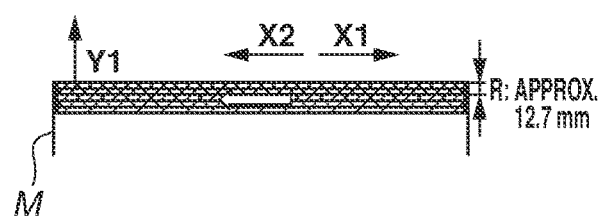

The main-scanning relevant processing to be performed at this time (four-pass, W=4, and S=1) is basically similar to the above-described main-scanning relevant processing. In step S701 illustrated in FIG. 7, the CPU 400 causes the carriage 111 to perform main scanning in the backward direction, and causes ink to be discharged during that time, thus recording an image. FIG. 11E is a plan view schematically illustrating the recording medium M at this time. In FIG. 11E, a portion indicated by "R" represents a portion in which an image is completed by recording in main scanning performed four times.

Then, in step S702, the CPU 400 performs addition to the dot count value. In step S703 to step S705, the CPU 400 resets the value of the counter S to "0" and then ends the main-scanning relevant processing.

Referring back to FIG. 5, in step S504, the CPU 400 determines whether recording of an image for one page has been ended by the recording operation performed in step S701, and, if the result of determination in step S504 is "yes" (YES in step S504), the CPU 400 advances the processing to step S514.

On the other hand, if the result of determination in step S504 is "no" (NO in step S504), i.e., in a case where, even when the recording operation in step S701 has been performed, recording for that page has not yet ended, the CPU 400 advances the processing to step S505 to perform sub-scanning. The amount of conveyance performed at this time is one-fourth of the length in the sub-scanning direction of a recording region subjected to recording on the recording medium in step S701, i.e., approximately 6.35 mm.

After performing step S505, the CPU 400 advances the processing to step S506 to determine whether the MaxDC value exceeds the intra-page threshold value SDth. The MaxDC value here is a value obtained by adding the dot count value obtained in step S702 to a value about which the result of determination in step S506 performed last time is "yes", i.e., a value exceeding the intra-page threshold value SDth. Accordingly, since the MaxDC value exceeds the intra-page threshold value SDth, the result of determination in step S506 is "yes" (YES in step S506), so that the CPU 400 advances the processing to step S508.

Then, in step S508, the CPU 400 increments the value of the counter W to "5". At this time (four-pass, W=5, and S=0), the column for the operation trigger T illustrated in FIG. 9 indicates "Ww" and a wait time is 0 seconds. Accordingly, the result of determination in step S509 is "yes" (YES in step S509), and, then in step S510, the CPU 400 performs wipe relevant processing. Furthermore, as mentioned above, a time of about 15 seconds is required to perform the wipe relevant processing. Then, since the result of determination in step S511 is "no" (NO in step S511), without performing waiting (a wait time of 0 seconds) in step S512, the CPU 400 returns the processing to step S503, i.e., the main-scanning relevant processing.

Figure 11F:
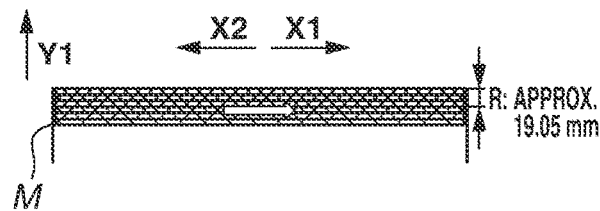

The main-scanning relevant processing to be performed at this time (four-pass, W=5, and S=0) is basically similar to the above-described main-scanning relevant processing. In step S701 illustrated in FIG. 7, the CPU 400 causes the carriage 111 to perform main scanning in the forward direction, and causes ink to be discharged during that time, thus recording an image. FIG. 11F is a plan view schematically illustrating the recording medium M at this time. In FIG. 11F, a portion indicated by "R" represents a portion in which an image is completed by recording in main scanning performed four times.

Then, in step S702, the CPU 400 performs addition to the dot count value. In step S703 to step S704, the CPU 400 updates the value of the counter S to "1" and then ends the main-scanning relevant processing.

Referring back to FIG. 5, in step S504, the CPU 400 determines whether recording of an image for one page has been ended by the recording operation performed in step S701, and, if the result of determination in step S504 is "yes" (YES in step S504), the CPU 400 advances the processing to step S514.

On the other hand, if the result of determination in step S504 is "no" (NO in step S504), i.e., in a case where, even when the recording operation in step S701 has been performed, recording for that page has not yet ended, the CPU 400 advances the processing to step S505 to perform sub-scanning. The amount of conveyance performed at this time is one-fourth of the length in the sub-scanning direction of a recording region subjected to recording on the recording medium in step S701, i.e., approximately 6.35 mm.

After performing step S505, the CPU 400 advances the processing to step S506 to determine whether the MaxDC value exceeds the intra-page threshold value SDth. The MaxDC value here is a value obtained by adding, in step S804, the dot count value to a value reset to "0" in step S802. Since this value is a value of about 1×10 to the sixth power, the result of determination in step S506 is "no" (NO in step S506), so that the CPU 400 advances the processing to step S507.

In step S507, the CPU 400 determines whether the value of the counter W is "0". Since the value of the counter W at this time is "5", the result of determination in step S507 is "no" (NO in step S507), so that the CPU 400 advances the processing to step S508.

In step S508, the CPU 400 increments the value of the counter W to "6". At this time (four-pass, W=6, and S=1), the column for the operation trigger T illustrated in FIG. 9 is blank and a wait time is 8 seconds. Accordingly, the result of determination in step S509 is "no" (NO in step S509) and the result of determination in step S511 is also "no" (NO in step S511), and, after waiting for 8 seconds in step S512, the CPU 400 returns the processing to step S503, i.e., the main-scanning relevant processing.

Figure 11G:
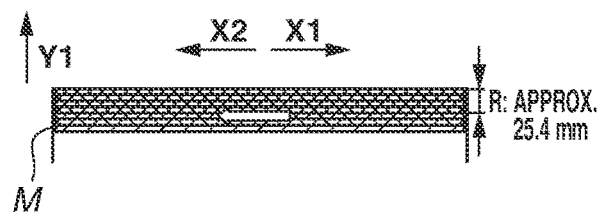

The main-scanning relevant processing to be performed at this time (four-pass, W=6, and S=1) is basically similar to the above-described main-scanning relevant processing. In step S701 illustrated in FIG. 7, the CPU 400 causes the carriage 111 to perform main scanning in the backward direction, and causes ink to be discharged during that time, thus recording an image. FIG. 11G is a plan view schematically illustrating the recording medium M at this time. In FIG. 11G, a portion indicated by "R" represents a portion in which an image is completed by recording in main scanning performed four times.

In step S702, the CPU 400 performs addition to the dot count value. In step S703 to step S705, the CPU 400 updates the value of the counter S to "0" and then ends the main-scanning relevant processing.

Referring back to FIG. 5, in step S504, the CPU 400 determines whether recording of an image for one page has been ended by the recording operation performed in step S701, and, if the result of determination in step S504 is "yes" (YES in step S504), the CPU 400 advances the processing to step S514.

On the other hand, if the result of determination in step S504 is "no" (NO in step S504), i.e., in a case where, even when the recording operation in step S701 has been performed, recording for that page has not yet ended, the CPU 400 advances the processing to step S505 to perform sub-scanning. The amount of conveyance performed at this time is one-fourth of the length in the sub-scanning direction of a recording region subjected to recording on the recording medium in step S701, i.e., approximately 6.35 mm.

After performing step S505, the CPU 400 advances the processing to step S506 to determine whether the MaxDC value exceeds the intra-page threshold value SDth. The MaxDC value here is a value obtained by adding, in step S804, the dot count value and adding, in step S702 once, the dot count value to a value reset to "0" in step S802. Since this value is a value less than $1 \times 10$ to the seventh power, the result of determination in step S506 is "no" (NO in step S506), so that the CPU 400 advances the processing to step S507.

In step S507, the CPU 400 determines whether the value of the counter W is "0", and, since the value of the counter W at this time is "6", the result of determination in step S507 is "no" (NO in step S507), so that the CPU 400 advances the processing to step S508.

In step S508, the CPU 400 increments the value of the counter W to "7". At this time (four-pass, W=7, and S=0), the column for the operation trigger T illustrated in FIG. 9 is blank and a wait time is 4 seconds. Accordingly, the result of determination in step S509 is "no" (NO in step S509) and the result of determination in step S511 is also "no" (NO in step S511), and, after waiting for 4 seconds in step S512, the CPU 400 returns the processing to step S503, i.e., the main-scanning relevant processing.

Figure 11H:
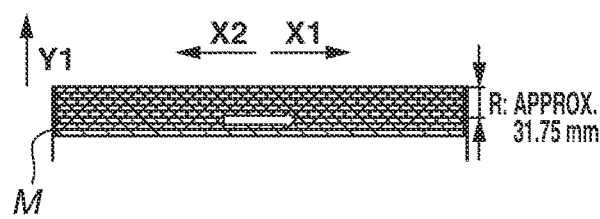

The main-scanning relevant processing to be performed at this time (four-pass, W=7, and S=0) is basically similar to the above-described main-scanning relevant processing. In step S701 illustrated in FIG. 7, the CPU 400 causes the carriage 111 to perform main scanning in the forward direction, and causes ink to be discharged during that time, thus recording an image. FIG. 11H is a plan view schematically illustrating the recording medium M at this time. In FIG. 11H, a portion indicated by "R" represents a portion in which an image is completed by recording in main scanning performed four times.

In step S702, the CPU 400 performs addition to the dot count value. In step S703 to step S704, the CPU 400 updates the value of the counter S to "1" and then ends the main-scanning relevant processing.

Referring back to FIG. 5, in step S504, the CPU 400 determines whether recording of an image for one page has been ended by the recording operation performed in step S701, and, if the result of determination in step S504 is "yes" (YES in step S504), the CPU 400 advances the processing to step S514.

On the other hand, if the result of determination in step S504 is "no" (NO in step S504), i.e., in a case where, even when the recording operation in step S701 has been performed, recording for that page has not yet ended, the CPU 400 advances the processing to step S505 to perform sub-scanning. The amount of conveyance performed at this time is one-fourth of the length in the sub-scanning direction of a recording region subjected to recording on the recording medium in step S701, i.e., approximately 6.35 mm.

After performing step S505, the CPU 400 advances the processing to step S506 to determine whether the MaxDC value exceeds the intra-page threshold value SDth. The MaxDC value here is a value obtained by adding, in step S804, the dot count value and adding, in step S702 two times, the dot count value to a value reset to "0" in step S802. Since this value is a value less than $1.5 \times 10$ to the seventh power, the result of determination in step S506 is "no" (NO in step S506), so that the CPU 400 advances the processing to step S507.

In step S507, the CPU 400 determines whether the value of the counter W is "0", and, since the value of the counter W at this time is "7", the result of determination in step S507 is "no" (NO in step S507), so that the CPU 400 advances the processing to step S508.

In step S508, the CPU 400 increments the value of the counter W to "8". At this time (four-pass, W=8, and S=1), the column for the operation trigger T illustrated in FIG. 9 is blank and a wait time is 2 seconds. Accordingly, the result of determination in step S509 is "no" (NO in step S509) and the result of determination in step S511 is also "no" (NO in step S511), and, after waiting for 2 seconds in step S512, the CPU 400 returns the processing to step S503, i.e., the main-scanning relevant processing.

Figure 11I:
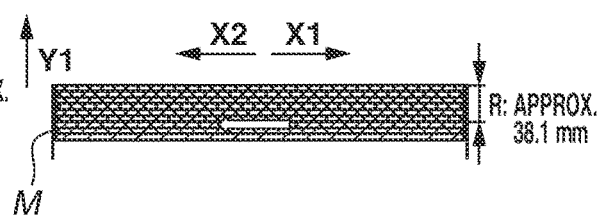

The main-scanning relevant processing to be performed at this time (four-pass, W=8, and S=1) is basically similar to the above-described main-scanning relevant processing. In step S701 illustrated in FIG. 7, the CPU 400 causes the carriage 111 to perform main scanning in the backward direction, and causes ink to be discharged during that time, thus recording an image. FIG. 11I is a plan view schematically illustrating the recording medium M at this time. In FIG. 11I, a portion indicated by "R" represents a portion in which an image is completed by recording in main scanning performed four times.

In step S702, the CPU 400 performs addition to the dot count value. In step S703 to step S705, the CPU 400 updates the value of the counter S to "0" and then ends the main-scanning relevant processing.

Referring back to FIG. 5, in step S504, the CPU 400 determines whether recording of an image for one page has been ended by the recording operation performed in step S701, and, if the result of determination in step S504 is "yes" (YES in step S504), the CPU 400 advances the processing to step S514.

On the other hand, if the result of determination in step S504 is "no" (NO in step S504), i.e., in a case where, even when the recording operation in step S701 has been performed, recording for that page has not yet ended, the CPU 400 advances the processing to step S505 to perform sub-scanning. The amount of conveyance performed at this time is one-fourth of the length in the sub-scanning direction of a recording region subjected to recording on the recording medium in step S701, i.e., approximately 6.35 mm.

After performing step S505, the CPU 400 advances the processing to step S506 to determine whether the MaxDC value exceeds the intra-page threshold value SDth. The MaxDC value here is a value obtained by adding, in step S804, the dot count value and adding, in step S702 two times, the dot count value to a value reset to "0" in step S802. Since this value is a value less than $2\times10$ to the seventh power, the result of determination in step S506 is "no" (NO in step S506), so that the CPU 400 advances the processing to step S507.

In step S507, the CPU 400 determines whether the value of the counter W is "0", and, since the value of the counter W at this time is "8", the result of determination in step S507 is "no" (NO in step S507), so that the CPU 400 advances the processing to step S508.

In step S508, the CPU 400 increments the value of the counter W to "9". At this time (four-pass, W=9, and S=0), the column for the operation trigger T illustrated in FIG. 9 is blank and a wait time is 1 second. Accordingly, the result of determination in step S509 is "no" (NO in step S509) and the result of determination in step S511 is also "no" (NO in step S511), and, after waiting for 1 second in step S512, the CPU 400 returns the processing to step S503, i.e., the main-scanning relevant processing.

Figure 11J:
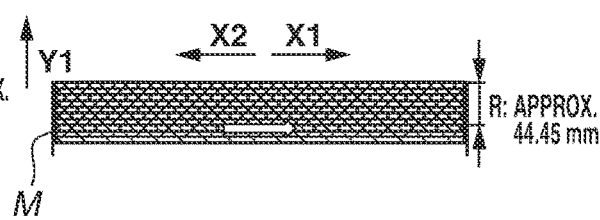

The main-scanning relevant processing to be performed at this time (four-pass, W=9, and S=0) is basically similar to the above-described main-scanning relevant processing. In step S701 illustrated in FIG. 7, the CPU 400 causes the carriage 111 to perform main scanning in the forward direction, and causes ink to be discharged during that time, thus recording an image. FIG. 11J is a plan view schematically illustrating the recording medium M at this time. In FIG. 11J, a portion indicated by "R" represents a portion in which an image is completed by recording in main scanning performed four times.

In step S702, the CPU 400 performs addition to the dot count value. In step S703 to step S704, the CPU 400 updates the value of the counter S to "1" and then ends the main-scanning relevant processing.

Referring back to FIG. 5, in step S504, the CPU 400 determines whether recording of an image for one page has been ended by the recording operation performed in step S701, and, if the result of determination in step S504 is "yes" (YES in step S504), the CPU 400 advances the processing to step S514.

On the other hand, if the result of determination in step S504 is "no" (NO in step S504), i.e., in a case where, even when the recording operation in step S701 has been performed, recording for that page has not yet ended, the CPU 400 advances the processing to step S505 to perform sub-scanning. The amount of conveyance performed at this time is one-fourth of the length in the sub-scanning direction of a recording region subjected to recording on the recording medium in step S701, i.e., approximately 6.35 mm.

After performing step S505, the CPU 400 advances the processing to step S506 to determine whether the MaxDC value exceeds the intra-page threshold value SDth. The MaxDC value here is a value obtained by adding, in step S804, the dot count value and adding, in step S702 four times, the dot count value to a value reset to "0" in step S802. Since this value is a value less than $2.5\times10$ to the seventh power, the result of determination in step S506 is "no" (NO in step S506), so that the CPU 400 advances the processing to step S507.

In step S507, the CPU 400 determines whether the value of the counter W is "0", and, since the value of the counter W at this time is "9", the result of determination in step S507 is "no" (NO in step S507), so that the CPU 400 advances the processing to step S508.

In step S508, the CPU 400 increments the value of the counter W to "10". At this time (four-pass, W=10, and S=1), the column for the operation trigger T illustrated in FIG. 9 indicates "WE". Accordingly, the result of determination in step S509 is "no" (NO in step S509) and the result of determination in step S511 is "yes" (YES in step S511), so that the CPU 400 advances the processing to step S513.

In step S513, the CPU 400 resets the value of the counter W to "0", and then returns the processing to step S503, i.e., the main-scanning relevant processing.

The main-scanning relevant processing to be performed at this time (four-pass, W=0, and S=1) is basically similar to the above-described main-scanning relevant processing. In step S701 illustrated in FIG. 7, the CPU 400 causes the carriage 111 to perform main scanning in the backward direction, and causes ink to be discharged during that time, thus recording an image.

In step S702, the CPU 400 performs addition to the dot count value. In step S703 to step S705, the CPU 400 updates the value of the counter S to "0" and then ends the main-scanning relevant processing.

Referring back to FIG. 5, in step S504, the CPU 400 determines whether recording of an image for one page has been ended by the recording operation performed in step S701, and, if the result of determination in step S504 is "yes" (YES in step S504), the CPU 400 advances the processing to step S514.

On the other hand, if the result of determination in step S504 is "no" (NO in step S504), i.e., in a case where, even when the recording operation in step S701 has been performed, recording for that page has not yet ended, the CPU 400 advances the processing to step S505 to perform sub-scanning. The amount of conveyance performed at this time is one-fourth of the length in the sub-scanning direction of a recording region subjected to recording on the recording medium in step S701, i.e., approximately 6.35 mm.

After performing step S505, the CPU 400 advances the processing to step S506 to determine whether the MaxDC value exceeds the intra-page threshold value SDth. The MaxDC value here is a value obtained by adding, in step S804, the dot count value and adding, in step S702 five times, the dot count value to a value reset to "0" in step S802. Since this value is a value less than $3\times10$ to the seventh power, the result of determination in step S506 is "no" (NO in step S506), so that the CPU 400 advances the processing to step S507.

In step S507, the CPU 400 determines whether the value of the counter W is "0", and, since the value of the counter W at this time is "0", the result of determination in step S507 is "yes" (YES in step S507), so that the CPU 400 returns the processing to step S503, i.e., the main-scanning relevant processing.

After that, as mentioned above, the CPU 400 repeats the processing in step S503 to step S507 until the result of determination in step S504 becomes "yes". After recording of an image for one page has ended (YES in step S504), the CPU 400 advances the processing to step S514.

In this way, the CPU 400 performs control such that, toward the timing of execution of wipe relevant processing, a time difference between main scanning operations progressively becomes longer and, after execution of wipe relevant processing, a time difference between main scanning operations progressively becomes shorter and then returns to an original time. As a result, a time difference between main scanning operations does not rapidly change, so that the occurrence of time difference unevenness can be prevented or reduced.

Next, processing in step S514 and subsequent steps is described. If the result of determination in step S504 is "yes" (YES in step S504), i.e., in a case where recording for one page has ended, then in step S514, the CPU 400 causes the carriage 111 to be moved to the home position by rotation of a carriage motor (not illustrated). The home position (hereinafter also referred to as "HP") is the position of the carriage 111 taken when the ink discharge ports of the recording head 100 are capped by the cap 130.

In step S515, the CPU 400 causes the recording medium to be discharged by a known unit (not illustrated), and, in step S516, the CPU 400 determines whether a printing command for a next page has been input. If the result of determination in step S516 is "yes" (YES in step S516), i.e., in a case where a printing command for a next page has been input, the CPU 400 advances the processing to step S517 to acquire data about the number of passes included in the printing command for a next page. In step S518, the CPU 400 determines whether the data about the number of passes acquired in step S517 indicates one-pass. If the result of determination in step S518 is "no" (NO in step S518), i.e., in a case where the acquired data about the number of passes indicates not one-pass but multipass recording, the CPU 400 advances the processing to step S519.

In step S519, the CPU 400 sets an inter-page threshold value PDth to the second inter-page threshold value PD2th. In the present exemplary embodiment, the second inter-page threshold value PD2th is 500,000,000, i.e., $5 \times 10$ to the eighth power.

The second inter-page threshold value PD2th is described as follows. In a case where the MaxDC value is a value less than or equal to the second inter-page threshold value PD2th, even if, after that, an image with a size slightly smaller than the A2 size has been recorded, the MaxDC value does not exceed the above-mentioned intra-page threshold value SDth in the process of image recording for one page. Thus, the MaxDC value being a value less than or equal to the second inter-page threshold value PD2th means that wiping between main scanning operations is not performed in the process of recording of an image for one page to be performed on a recording medium with a fixed size after that.

After performing step S519, the CPU 400 advances the processing to step S521 to determine whether the MaxDC value is a value exceeding the inter-page threshold value PDth. As mentioned above, the inter-page threshold value PDth here is set to the second inter-page threshold value PD2th.

If the result of determination in step S521 is "yes" (YES in step S521), i.e., in a case where the MaxDC value is a value exceeding the second inter-page threshold value PD2th, the CPU 400 advances the processing to wipe relevant processing in step S522. This is performed to determine whether there is a possibility of wiping being performed in the process of multipass recording for a next page, and, if there is a possibility of wiping being performed, the CPU 400 performs wiping in advance before recording for a next page is started. This causes the dot count value to be reset and, in a case where recording for a next page is recording on a recording medium with a fixed size smaller than or equal to the A2 size, enables preventing wiping from being performed in the process of recording. Furthermore, the wipe relevant processing in step S522 is similar to the above-mentioned wipe relevant processing in step S510 and is, therefore, omitted from description.

After performing the wipe relevant processing in step S522, the CPU 400 performs pre-recording processing in step S502 and a recording operation in the multipass mode in step S503. Furthermore, processing for moving the cap 130 from the capping position to the separation position in step S604 included in the pre-recording processing is skipped here because the cap 130 is already situated at the separation position.

On the other hand, if the result of determination in step S521 is "no" (NO in step S521), i.e., in a case where the MaxDC value is less than or equal to the second inter-page threshold value PD2th, without performing the wipe relevant processing, the CPU 400 returns the processing to the pre-recording processing in step S502. In a case where the MaxDC value is less than or equal to the second inter-page threshold value PD2th, if the recording medium is a recording medium with a fixed size, wiping is not performed in the process of recording for a next page. Therefore, in a case where the MaxDC value is less than or equal to the second inter-page threshold value PD2th, even if the recording mode for a next page is the multipass mode, the CPU 400 returns the processing to step S502 without performing the wipe relevant processing.

Then, after performing the pre-recording processing in step S502, the CPU 400 starts a recording operation in the multipass mode. Even at this time, the CPU 400 skips step S604.

If the result of determination in step S518 is "yes" (YES in step S518), i.e., in a case where the data about the number of passes acquired in step S517 indicates one-pass recording, the CPU 400 advances the processing to step S520.

In step S520, the CPU 400 sets the inter-page threshold value PDth to a first inter-page threshold value PD1th. In the present exemplary embodiment, the first inter-page threshold value PD1th is 1,090,000,000, i.e., $1.09 \times 10$ to the ninth power, which is smaller by about $1 \times 10$ to the seventh power (about 1%) than the above-mentioned intra-page threshold value SDth ($1.1 \times 10$ to the ninth power).

After performing step S520, the CPU 400 advances the processing to step S521 to determine whether the MaxDC value is a value exceeding the inter-page threshold value PDth. The inter-page threshold value PDth at this time is set to the first inter-page threshold value PD1th in step S520. If the result of determination in step S521 is "yes" (YES in step S521), i.e., in a case where the MaxDC value is a value exceeding the first inter-page threshold value PD1th, the CPU 400 advances the processing to wipe relevant processing in step S522. Thus, in a case where there is a possibility of the MaxDC value exceeding the intra-page threshold value SDth immediately after starting of recording on a next recording medium, the CPU 400 performs wiping in advance at this timing before starting of recording. The wipe relevant processing in step S522 is similar to the wipe relevant processing in step S510 and is, therefore, omitted from description.

After performing step S522, the CPU 400 performs pre-recording processing in step S502, and then, starts image recording in the one-pass mode. Even at this time, the CPU 400 skips step S604.

On the other hand, if the result of determination in step S521 is "no" (NO in step S521), i.e., in a case where the MaxDC value is a value less than or equal to the first inter-page threshold value PD1th, the CPU 400 returns the processing to the pre-recording processing in step S502 without performing wipe relevant processing. In a case where the recording mode to be performed on a next recording medium is the one-pass mode, even if wiping is performed between main scanning operations after starting of recording, time difference unevenness does not occur. Accordingly, at timing after ending of recording on the former recording medium and before starting of recording on a next recording medium, the CPU 400 returns the processing to step S502 without performing wipe relevant processing.

Performing such control enables decreasing the frequency of execution of wipe relevant processing between pages, i.e., at timing after ending of recording on the former recording medium and before starting of recording on a next recording medium. As a result, in the case of successively recording images on a plurality of recording media, a period of time required for recording can be shortened and a throughput can be increased.

After performing the pre-recording processing in step S502, the CPU 400 starts a recording operation in the one-pass mode. Even at this time, the CPU 400 skips step S604.

On the other hand, if the result of determination in step S516 is "no" (NO in step S516), i.e., in a case where a printing command for a next recording medium has not yet been input until ending of step S515, the CPU 400 advances the processing to step S523. In step S523, the CPU 400 determines whether the MaxDC value is a value exceeding a post-page threshold value EDth. In the present exemplary embodiment, the post-page threshold value EDth is 20,000,000, i.e., 2×10 to the seventh power.

If the result of determination in step S523 is "yes" (YES in step S523), i.e., in a case where the MaxDC value exceeds the post-page threshold value EDth, the CPU 400 advances the processing to step S524 to perform wipe relevant processing. This time, since a recording command for a next recording medium is not issued, performing wipe relevant processing does not affect a period of time required for a recording operation. Setting a relatively small value as the post-page threshold value EDth facilitates execution of wiping processing and enables maintaining or recovering the discharge performance of the recording head 100.

After ending of the wipe relevant processing in step S524, the CPU 400 advances the processing to step S525 to move the cap 130 from the separation position to the capping position, and then ends the recording operation.

On the other hand, if the result of determination in step S523 is "no" (NO in step S523), i.e., in a case where the MaxDC value is less than or equal to the post-page threshold value EDth, without performing wipe relevant processing, the CPU 400 advances the processing to step S525 to perform capping. This is because, in a case where the MaxDC value is less than or equal to the post-page threshold value EDth, there is almost no ink adhering to the discharge port surface 102 of the recording head 100 and it is thus unnecessary to perform wiping. After ending of capping in step S525, the CPU 400 ends the recording operation.

As described above, when successively performing a recording operation on a plurality of recording media, the CPU 400 determines whether a recording operation for recording an image for the (n+1)-th page (n being a natural number) is in the multipass recording mode, which makes time difference unevenness likely to be visible. Then, the CPU 400 appropriately determines whether to perform a recovery operation in between the n-th page and the (n+1)-th page, based on a result of the above determination. This causes a recovery operation such as wiping to be appropriately performed and thus enables preventing or reducing a decrease in image quality by maintaining or recovering the recording performance, while shortening a period of time required for recording.

Furthermore, while, in the present exemplary embodiment, threshold values are respectively set with respect to the one-pass mode and the four-pass mode, a configuration in which there is a plurality of recording modes differing in their conditions even with respect to the same number of passes can be employed, and such a plurality of recording modes includes, for example, a recording mode group including a plurality of one-pass modes differing in main scanning speed and a recording mode group including a plurality of four-pass modes differing main scanning speed. Then, a configuration in which an inter-page threshold value and an inter-page threshold value are set for each of the recording modes can also be employed. At this time, the largest value of the threshold values corresponding to the one-pass mode is set to a value larger than the largest value of the threshold values corresponding to the two-pass or more, multipass, mode.

While, in the above-described first exemplary embodiment, an example of an inkjet recording apparatus having recording modes such as one-pass mode and four-pass mode has been described, in the following second exemplary embodiment, an inkjet recording apparatus further having anomalous two-pass mode is described. Furthermore, portions similar to those in the above-described first exemplary embodiment are omitted from description.

Figure 12:
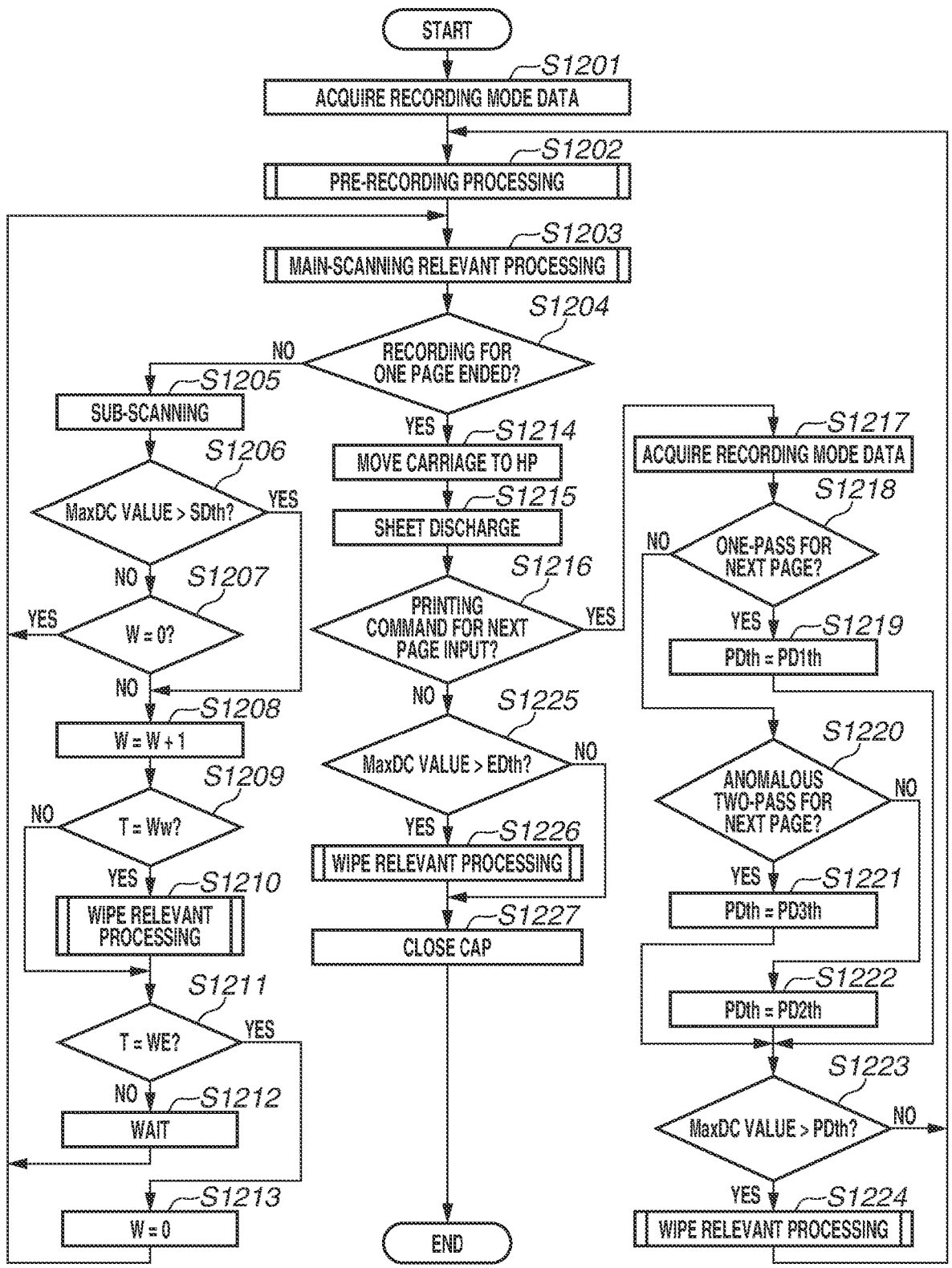
FIG. 12 is a flowchart illustrating a recording operation in a second exemplary embodiment.

In the following description, a recording operation of the recording apparatus according to the second exemplary embodiment is described with reference to FIG. 12 to FIGS. 15A and 15B. FIG. 12 is a flowchart illustrating a recording operation in the present exemplary embodiment. With regard to details of each processing operation, portions similar to those illustrated in FIG. 5 are omitted from description. FIG. 14 is a diagram illustrating a relationship between the number of passes, the value of the counter W, the value of the counter S, the operation trigger T, and a wait time in an anomalous two-pass mode, which is described in the present exemplary embodiment.

When the recording apparatus according to the present exemplary embodiment receives a printing command, in step S1201, the CPU 400 acquires recording mode data included in the printing command. In the following description, an example of a recording operation which is performed in a case where the acquired recording mode is the anomalous two-pass mode and an image with a size slightly smaller than the A2 size is to be recorded on a recording medium with the A2 size is described.

After acquiring the number of passes in step S1201, then in step S1202, the CPU 400 performs pre-recording processing. The pre-recording processing is similar to the pre-recording processing described in the first exemplary embodiment.

Figure 15A:
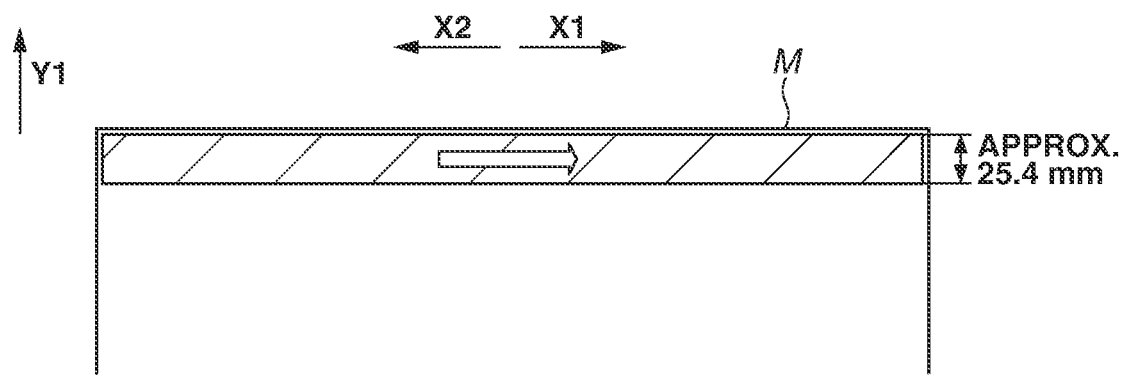
FIGS. 15A and 15B are diagrams illustrating a recording operation for anomalous two-pass mode in the second exemplary embodiment.

Then, the CPU 400 advances the processing to main-scanning relevant processing in step S1203. In step S701 illustrated in FIG. 7, the CPU 400 causes the carriage 111 to perform main scanning in the forward direction and, at the same time, causes ink to be discharged during the main scanning, thus recording an image. In this occasion, the length in the direction Y1 of a recording region subjected to recording on a recording medium is approximately 1 inch=approximately 25.4 mm. FIG. 15A is a plan view schematically illustrating a recording medium M in the above-mentioned state.

After performing step S701, then in step S702, the CPU 400 performs addition to the dot count value. In the present exemplary embodiment, the CPU 400 adds, to each dot counter, a value obtained by multiplying the number of ink droplets discharged from each discharge port array in step S701 by a coefficient.

FIG. 13 illustrates a table used to explain coefficients for use in the present processing. Here, consider imaginary lattice points at intervals of 1,200 dots per inch (dpi) in the main scanning direction and 1,200 dpi in the sub-scanning direction on a recording medium. With regard to the imaginary lattice points, 1,440,000 lattice points are included in the range of 1 inch in the main scanning direction by 1 inch in the sub-scanning direction (hereinafter also referred to as a "target range") on a recording medium. The column "Duty" illustrated in FIG. 13 represents the amount of ink to be applied per unit area, and is a value expressed as a percentage of a value obtained by dividing the number of ink droplets discharged from each discharge port array toward the target range in step S701 by "1,440,000". Thus, in step S702, the CPU 400 adds, to each dot counter, a value obtained by multiplying the number of ink droplets discharged from each discharge port array in step S701 by a coefficient, which becomes a larger value as the duty becomes higher. This is because, as the duty becomes higher, the amount of ink per dot which adheres to the discharge port surface 102 of the recording head 100 is larger.

After performing step S702, then in step S703, the CPU 400 increments the value of the counter S. Since the value of the counter S at this time is "0", the value of the counter S obtained by the processing performed in step S703 is updated to "1".

In step S704, the CPU 400 determines whether the value of the counter S is greater than or equal to "2". At this time, since the value of the counter S is "1", the result of determination in step S704 is "no" (NO in step S704). As a result, the CPU 400 skips step S705 and then ends the main-scanning relevant processing.

Referring back to FIG. 12, in step S1204, the CPU 400 determines whether recording of an image on a recording medium for one page has been ended by the recording operation performed in step S701. Since, as an image with a size slightly smaller than the A2 size is recorded, the length in the sub-scanning direction of an image recorded in this stage is only approximately 25.4 mm, the result of determination in step S1204 is "no" (NO in step S1204).

Then, the CPU 400 advances the processing to step S1205 to perform sub-scanning by an amount of conveyance corresponding to the value of the counter S. Since the value of the counter S here is "1", the amount of conveyance is approximately 0 mm. Details of this are described below.

In step S1206, the CPU 400 determines whether the MaxDC value exceeds the intra-page threshold value SDth. In the present exemplary embodiment, the intra-page threshold value SDth is "1,100,000,000, i.e., $1.1 \times 10$ to the ninth power, as with the first exemplary embodiment.

If the result of determination in step S1206 is "no" (NO in step S1206), the CPU 400 advances the processing to step S1207. In step S1207, the CPU 400 determines whether the value of the counter W is "0", and, since the value of the counter W at this time is "0", the result of determination in step S1207 is "yes" (YES in step S1207), so that the CPU 400 returns the processing to the main-scanning relevant processing in step S1203.

Figure 15B:
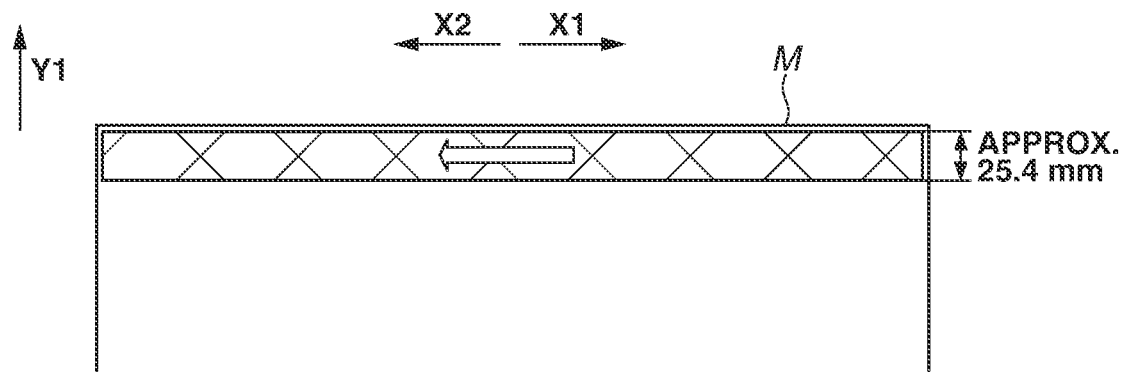

In the main-scanning relevant processing here, in step S701 illustrated in FIG. 7, the CPU 400 causes the carriage 111 to perform main scanning in the backward direction, and causes ink to be discharged during that scanning, thus recording an image. In this case, ink is discharged onto a recording region already subjected to recording on a recording medium, so that an image is recorded on the recording region. FIG. 15B is a plan view schematically illustrating the recording medium M at this time.

After performing step S701, then in step S702, the CPU 400 performs addition to the dot count value. Here, during recording in step S701, a value obtained by multiplying the number of ink droplets discharged from each discharge port array by a coefficient shown in the table illustrated in FIG. 13 is added to each dot counter.

Then, in step S703, the CPU 400 increments the value of the counter S. Since the value of the counter S at this time is "1", the value of the counter S is updated to "2" by the processing performed in step S703.

In step S704, the CPU 400 determines whether the value of the counter S is greater than or equal to "2". At this time, since the value of the counter S is "2", the result of determination in step S704 is "yes" (YES in step S704), and, then in step S705, the CPU 400 resets the value of the counter S to "0" and then ends the main-scanning relevant processing.

Referring back to FIG. 12, in step S1204, the CPU 400 determines whether recording of an image for one page has been ended by the recording operation performed in step S701. Since the length in the sub-scanning direction of a portion subjected to recording up to this point is approximately 25.4 mm, the result of determination in step S1204 is "no" (NO in step S1204), so that the CPU 400 advances the processing to step S1205 again.

In step S1205, the CPU 400 performs sub-scanning by an amount of conveyance corresponding to the value of the counter S. Since the value of the counter S at this time is "0", the amount of conveyance is approximately 25.4 mm.

In step S1206, the CPU 400 determines whether the MaxDC value exceeds the intra-page threshold value SDth, and, if the result of determination in step S1206 is "no" (NO in step S1206), the CPU 400 advances the processing to step S1207 to determine whether the value of the counter W is "0". Since the value of the counter W at this time is "0", the result of determination in step S1207 is "yes" (YES in step S1207), so that the CPU 400 returns the processing to step S1203 again.

If the MaxDC value does not exceed the intra-page threshold value SDth, the CPU 400 repeats processing in step S1203 to step S1207 until the result of determination in step S1204 becomes "yes". After ending of recording for one page, the CPU 400 advances the processing to step S1214. Processing operations in step S1214 and subsequent steps are described below.

In the above-described processing, the CPU 400 repeats recording during main scanning in the forward direction of the carriage 111, sub-scanning by an amount of conveyance of approximately 0 mm of a recording medium, recording during main scanning in the backward direction of the carriage 111, and sub-scanning by an amount of conveyance of approximately 25.4 mm of the recording medium, thus completing recording of an image for one page. Such a recording mode is referred to as "anomalous two-pass mode". Employing the anomalous two-pass mode enables preventing or reducing the occurrence of what is called "color order unevenness", which may occur in recording an image with a relatively high duty in, for example, the one-pass mode. The color order unevenness is image unevenness which may occur in a case where impact orders on a recording medium of various color inks discharged from the respective discharge port arrays of the recording head 100 differ. For example, in the one-pass mode, since the scanning direction of the carriage is inverted each time a recording medium is conveyed, impact orders on the recording medium of various color inks also become inverted. As a result, the color order unevenness in the one-pass mode appears as an image unevenness at pitches of the amount of conveyance in the sub-scanning direction.

If the result of determination in step S1206 is "yes" (YES in step S1206), i.e., in a case where the MaxDC value exceeds the intra-page threshold value SDth, then in step S1208, the CPU 400 increments the value of the counter W. Since the value of the counter W at this time is "0", the value of the counter W is updated to "1" by the processing performed in step S1208.

After performing step S1208, the CPU 400 advances the processing to step S1209 to determine whether the operation trigger T is "Ww". For example, in a case where the MaxDC value has exceeded the intra-page threshold value SDth due to recording in main scanning in the forward direction, the value of the counter S is "1". Moreover, since, at this time, the recording mode is the anomalous two-pass mode and the value of the counter W is "1", the column for the operation trigger T illustrated in FIG. 14 at this time is blank. Since the column for the operation trigger T illustrated in FIG. 14 is bank and does not indicate "Ww", the result of determination in step S1209 at this time is "no" (NO in step S1209), the CPU 400 advances the processing to step S1211.

In step S1211, the CPU 400 determines whether the operation trigger T is "WE". Since the column for the operation trigger T illustrated in FIG. 14 at this time (anomalous two-pass, W=1, and S=1) is blank, the result of determination in step S1211 is "no" (NO in step S1211), so that the CPU 400 advances the processing to step S1212.

In step S1212, the CPU 400 performs a waiting operation (wait). Since a wait time at this time (anomalous two-pass, W=1, and S=1) is 0 seconds as illustrated in FIG. 14, without performing a waiting operation (wait), the CPU 400 returns the processing to the main-scanning relevant processing in step S1203.

In the main-scanning relevant processing at this time (anomalous two-pass, W=1, and S=1), in step S701 illustrated in FIG. 7, the CPU 400 causes the carriage 111 to perform main scanning in the backward direction and causes ink to be discharged during that scanning, thus recording an image.

After performing step S701, then in step S702, the CPU 400 performs addition to the dot count value. Again, during a recording operation in step S701, a value obtained by multiplying the number of ink droplets discharged from each discharge port array by a coefficient shown in the table illustrated in FIG. 13 is added to each dot counter.

After performing step S702, then in step S703 to step S705, the CPU 400 updates the value of the counter S to "0" and then ends the main-scanning relevant processing.

Referring back to FIG. 12, in step S1204, the CPU 400 determines whether recording on a recording medium for one page has been ended by the recording operation performed in step S701, and, if the result of determination in step S1204 is "yes" (YES in step S1204), the CPU 400 advances the processing to step S1214. If the result of determination in step S1204 is "no" (NO in step S1204), i.e., in a case where, even when the recording operation in step S701 has been performed, recording for that page has not yet ended, the CPU 400 advances the processing to step S1205 to perform sub-scanning by an amount of conveyance corresponding to the value of the counter S. Since the value of the counter S at this time is "0", the amount of conveyance is approximately 25.4 mm.

After performing step S1205, then in step S1206, the CPU 400 determines whether the MaxDC value exceeds the intra-page threshold value SDth. The MaxDC value at this time is a value obtained by adding the dot count value obtained in step S702 to a value about which the result of determination in step S1206 performed last time is "yes", i.e., a value exceeding the intra-page threshold value SDth, and, therefore, exceeds the intra-page threshold value SDth. Accordingly, the result of determination in step S1206 is "yes" (YES in step S1206), so that the CPU 400 advances the processing to step S1208.

In step S1208, the CPU 400 increments the value of the counter W. Since the value of the counter W at this time is "1", the value of the counter W is updated to "2" by the processing performed in step S1208.

In step S1209, the CPU 400 determines whether the operation trigger T is "Ww". At this time (anomalous two-pass, W=2, and S=0), since the column for the operation trigger T illustrated in FIG. 14 indicates "Ww", the result of determination in step S1209 is "yes" (YES in step S1209), so that the CPU 400 advances the processing to wipe relevant processing in step S1210. Furthermore, the wipe relevant processing is similar to the wipe relevant processing described in the first exemplary embodiment and is, therefore, omitted from description. Even in the wipe relevant processing in the present exemplary embodiment, a time of about 15 seconds is required as with the first exemplary embodiment.

In step S1211, the CPU 400 determines whether the operation trigger T is "WE". Since the column for the operation trigger T illustrated in FIG. 14 at this time (anomalous two-pass, W=2, and S=0) indicates "Ww" and does not indicate "WE", the result of determination in step S1211 is "no" (NO in step S1211), so that the CPU 400 advances the processing to step S1212.

In step S1212, the CPU 400 performs a waiting operation (wait). Since a wait time at this time (anomalous two-pass, W=2, and S=0) is 0 seconds as illustrated in FIG. 14, without performing a waiting operation (wait), the CPU 400 returns the processing to the main-scanning relevant processing in step S1203 again.

In the main-scanning relevant processing at this time (anomalous two-pass, W=2, and S=0), in step S701 illustrated in FIG. 7, the CPU 400 causes the carriage 111 to perform main scanning in the forward direction and causes ink to be discharged during that scanning, thus recording an image.

In step S702, the CPU 400 performs addition to the dot count value. Here, during recording in step S701, a value obtained by multiplying the number of ink droplets discharged from each discharge port array by a coefficient shown in the table illustrated in FIG. 13 is added to each dot counter. In processing in step S703 to step S704, the CPU 400 updates the value of the counter S to "1" and then ends the main-scanning relevant processing.

Referring back to FIG. 12, while, in step S1204, the CPU 400 determines whether recording of an image for one page has been ended by the recording operation performed in step S701, the result of determination at this time is "no". This is because, in a case where the recording mode is the anomalous two-pass mode, recording for one page is never ended by recording in main scanning in the forward direction.

The CPU 400 advances the processing to step S1205 to perform sub-scanning by an amount of conveyance corresponding to the value of the counter S. Since the value of the counter S at this time is "1", the amount of conveyance is approximately 0 mm.

In step S1206, the CPU 400 determines whether the MaxDC value exceeds the intra-page threshold value SDth. At this time, the MaxDC value is a value obtained by adding, in step S804, the dot count value to a value reset to "0" in step S802. Since this value is a value of about 1×10 to the sixth power, the result of determination in step S1206 is "no" (NO in step S1206), so that the CPU 400 advances the processing to step S1207.

In step S1207, the CPU 400 determines whether the value of the counter W is "0". Since the value of the counter W at this time is "2", the result of determination in step S1207 is "no" (NO in step S1207), so that the CPU 400 advances the processing to step S1208.

In step S1208, the CPU 400 increments the value of the counter W. Since the value of the counter W at this time is "2", the value of the counter W is updated to "3" by the processing performed in step S1208.

In step S1209, the CPU 400 determines whether the operation trigger T is "Ww". At this time (anomalous two-pass, W=3, and S=1), since the column for the operation trigger T illustrated in FIG. 14 indicates "WE" and does not indicate "Ww", the result of determination in step S1209 is "no" (NO in step S1209), so that the CPU 400 advances the processing to wipe relevant processing in step S1211.

In step S1211, the CPU 400 determines whether the operation trigger T is "WE". Since the column for the operation trigger T illustrated in FIG. 14 at this time (anomalous two-pass, W=3, and S=1) indicates "WE" as mentioned above, the result of determination in step S1211 is "yes" (YES in step S1211), so that the CPU 400 advances the processing to step S1213.

In step S1213, the CPU 400 resets the value of the counter W to "0", and then returns the processing to the main-scanning relevant processing in step S1203 again.

Then, as mentioned above, the CPU 400 repeats the processing in step S1203 to step S1207 until the result of determination in step S1204 becomes "yes". After image recording for one page has ended (YES in step S1204), the CPU 400 advances the processing to step S1214.

On the other hand, if the MaxDC value exceeds the intra-page threshold value SDth due to recording in main scanning in the backward direction, the result of determination in step S1206 is "yes" (YES in step S1206), so that the CPU 400 advances the processing to step S1208 to increment the value of the counter W to "1".

In step S1209, the CPU 400 determines whether the operation trigger T is "Ww" according to the recording mode and the values of the counters W and S. At this time, since the recording mode is the anomalous two-pass mode, the value of the counter W is "1", and the value of the counter S is "0", the column for the operation trigger T illustrated in FIG. 14 indicates "Ww". Accordingly, the result of determination in step S1209 is "yes" (YES in step S1209), so that the CPU 400 advances the processing to step S1210 to perform wipe relevant processing.

After performing the wipe relevant processing, the CPU 400 advances the processing to step S1211 to determine whether the operation trigger T is "WE". Since the column for the operation trigger T illustrated in FIG. 14 at this time (anomalous two-pass, W=1, and S=0) indicates "Ww" and does not indicate "WE" as mentioned above, the result of determination in step S1211 is "no" (NO in step S1211), so that the CPU 400 advances the processing to step S1212.

In step S1212, the CPU 400 performs a waiting operation (wait). Since a wait time at this time (anomalous two-pass, W=1, and S=0) is 0 seconds as illustrated in FIG. 14, without performing a waiting operation (wait), the CPU 400 returns the processing to the main-scanning relevant processing in step S1203 again.

In the main-scanning relevant processing at this time (anomalous two-pass, W=1, and S=0), in step S701 illustrated in FIG. 7, the CPU 400 causes the carriage 111 to perform main scanning in the forward direction and causes ink to be discharged during that scanning, thus recording an image. In step S702, the CPU 400 performs addition to the dot count value. Thus, during recording in step S701, a value obtained by multiplying the number of ink droplets discharged from each discharge port array by a coefficient shown in the table illustrated in FIG. 13 is added to each dot counter. In processing in step S703 to step S704, the CPU 400 updates the value of the counter S to "1" and then ends the main-scanning relevant processing.

Referring back to FIG. 12, while, in step S1204, the CPU 400 determines whether recording on a recording medium for one page has been ended by the recording operation performed in step S701, the result of determination at this time is "no". This is because, as mentioned above, in a case where the recording mode is the anomalous two-pass mode, recording for one page is never ended by recording in main scanning in the forward direction.

The CPU 400 advances the processing to step S1205 to perform sub-scanning by an amount of conveyance corresponding to the value of the counter S. Since the value of the counter S at this time is "1", the amount of conveyance is approximately 0 mm.

In step S1206, the CPU 400 determines whether the MaxDC value exceeds the intra-page threshold value SDth. The MaxDC value at this time is a value obtained by adding, in step S804, the dot count value and adding, in step S702 once, the dot count value to a value reset to "0" in step S802. Since this value is a value less than 0.5×10 to the sixth power, the result of determination in step S1206 is "no" (NO in step S1206), so that the CPU 400 advances the processing to step S1207.

In step S1207, the CPU 400 determines whether the value of the counter W is "0", and, since the value of the counter W at this time is "1", the result of determination in step S1207 is "no" (NO in step S1207), so that the CPU 400 advances the processing to step S1208.

In step S1208, the CPU 400 increments the value of the counter W. Since the value of the counter W at this time is "1", the value of the counter W is updated to "2" by the processing performed in step S1208.

In step S1209, the CPU 400 determines whether the operation trigger T is "Ww". At this time (anomalous two-pass, W=2, and S=1), since the column for the operation trigger T illustrated in FIG. 14 indicates "WE" and does not indicate "Ww", the result of determination in step S1209 is "no" (NO in step S1209), so that the CPU 400 advances the processing to wipe relevant processing in step S1211.

In step S1211, the CPU 400 determines whether the operation trigger T is "WE". Since the column for the operation trigger T illustrated in FIG. 14 at this time (anomalous two-pass, W=2, and S=1) indicates "WE" as mentioned above, the result of determination in step S1211 is "yes" (YES in step S1211), so that the CPU 400 advances the processing to step S1213.

In step S1213, the CPU 400 resets the value of the counter W to "0", and then returns the processing to the main-scanning relevant processing in step S1203 again.

Then, as mentioned above, the CPU 400 repeats the processing in step S1203 to step S1207 until the result of determination in step S1204 becomes "yes". After image recording for one page has ended (YES in step S1204), the CPU 400 advances the processing to step S1214.

With such control performed, wipe relevant processing, which is performed in between a given main scanning operation and a next main scanning operation, is performed after main scanning in the backward direction of the carriage 111, so that there is no movement in the backward direction of the carriage 111 to be performed only for wipe relevant processing.

Furthermore, at the time of the anomalous two-pass mode, even if wiping is performed after main scanning in the backward direction of the carriage 111, no time difference unevenness occurs in a recorded image. This is because no difference occurs in a time during which ink discharged at the time of a given main scanning operation and ink discharged at the time of a next main scanning operation become mixed with each other on a recording medium within an image for one page. However, if wiping is performed after main scanning in the forward direction of the carriage 111, a time difference unevenness occurs. This is because, only at a portion where wiping has been performed before and after scanning, a time required until ink discharged at the time of main scanning in the forward direction and ink discharged at the time of main scanning in the backward direction become mixed with each other on a recording medium becomes long.

Referring back to FIG. 12, if the result of determination in step S1204 is "yes" (YES in step S1204), i.e., in a case where recording for one page has ended, then in step S1214, the CPU 400 causes the carriage 111 to move to the home position. Then, in step S1215, the CPU 400 causes the recording medium to be discharged by a known unit (not illustrated).

In step S1216, the CPU 400 determines whether a printing command for a next page has been input. If the result of determination in step S1216 is "yes" (YES in step S1216), i.e., in a case where a printing command for a next page has been input, the CPU 400 advances the processing to step S1217 to acquire recording mode data included in the printing command for a next page.

In step S1218, the CPU 400 determines whether the acquired recording mode data indicates the one-pass mode. If the result of determination in step S1218 is "yes" (YES in step S1218), the CPU 400 advances the processing to step S1219 to set the inter-page threshold value PDth to a first inter-page threshold value PD1th. Furthermore, the first inter-page threshold value PD1th is 1,090,000,000, i.e., 1.09×10 to the ninth power, which is the same as the first inter-page threshold value PD1th described in the first exemplary embodiment.

In step S1223, the CPU 400 determines whether the MaxDC value is a value exceeding the inter-page threshold value PDth. As mentioned above, the inter-page threshold value PDth here is set to the first inter-page threshold value PD1th. If the result of determination in step S1223 is "yes" (YES in step S1223), the CPU 400 advances the processing to wipe relevant processing in step S1224. The wipe relevant processing is similar to the above-described wipe relevant processing and is, therefore, omitted from description.

The CPU 400 then returns the processing to the pre-recording processing in step S1202, and, after performing the pre-recording processing, the CPU 400 starts recording in the one-pass mode. Even at this time, as with the first exemplary embodiment, the CPU 400 skips step S604 illustrated in FIG. 6.

On the other hand, if the result of determination in step S1223 is "no" (NO in step S1223), i.e., in a case where the MaxDC value is a value less than or equal to the first inter-page threshold value PD1th, without performing wipe relevant processing, the CPU 400 directly returns the processing to the pre-recording processing in step S1202. Since the recording mode for a next page is the one-pass mode, even if wiping is performed in the process of recording for the next page, no time difference unevenness occurs. Here, the CPU 400 advances the processing to step S1202 without performing wipe relevant processing between pages.

Performing such control enables decreasing the frequency of execution of wipe relevant processing between pages and shortening a period of time required for a recording operation in the case of successively recording images for a plurality of pages.

After performing the pre-recording processing in step S1202, the CPU 400 starts a recording operation in the one-pass mode. Even at this time, the CPU 400 skips step S604 illustrated in FIG. 6.

Referring back to step S1218 illustrated in FIG. 12, if the result of determination therein is "no" (NO in step S1218), i.e., the acquired recording mode does not indicate the one-pass mode, the CPU 400 advances the processing to step S1220 to determine whether the recording mode data acquired in step S1217 indicates the anomalous two-pass mode. If the result of determination in step S1220 is "yes" (YES in step S1220), the CPU 400 advances the processing to step S1221.

In step S1221, the CPU 400 sets the inter-page threshold value PDth to a third inter-page threshold value PD3th. Furthermore, the third inter-page threshold value PD3th is 1,080,000,000, i.e., 1.08×10 to the ninth power, but can be set to the same value as the first inter-page threshold value PD1th.

In step S1223, the CPU 400 determines whether the MaxDC value exceeds the inter-page threshold value PDth. Here, the inter-page threshold value PDth is currently set to the third inter-page threshold value PD3th. If the result of determination in step S1223 is "yes" (YES in step S1223), i.e., the MaxDC value is a value exceeding the third inter-page threshold value PD3th, then in step S1224, the CPU 400 performs wipe relevant processing and then returns the processing to the pre-recording processing in step S1202. After performing the pre-recording processing, the CPU 400 starts recording in the anomalous two-pass mode. Even at this time, the CPU 400 skips step S604 illustrated in FIG. 6.

On the other hand, if the result of determination in step S1223 is "no" (NO in step S1223), i.e., in a case where the MaxDC value is less than or equal to the third inter-page threshold value PD3th, without performing the wipe relevant processing, the CPU 400 returns the processing to the pre-recording processing in step S1202. Thus, in a case where the recording mode for a next page is the anomalous two-pass mode and, even if wiping such as that described above is performed in the process of recording for the next page, no time difference unevenness occurs, the CPU 400 returns the processing to step S1202 without performing wipe relevant processing between pages. After performing the pre-recording processing in step S1202, the CPU 400 starts recording in the anomalous two-pass mode. Even at this time, the CPU 400 skips step S604 illustrated in FIG. 6.

Referring back to step S1220 illustrated in FIG. 12, if the result of determination therein is "no" (NO in step S1220), i.e., in a case where the acquired recording mode data indicates neither the one-pass mode nor the anomalous two-pass mode and thus indicates the multipass mode, the CPU 400 advances the processing to step S1222.

In step S1222, the CPU 400 sets the inter-page threshold value PDth to a second inter-page threshold value PD2th. Furthermore, the second inter-page threshold value PD2th is 500,000,000, i.e., 5×10 to the eighth power, which is the same as the second inter-page threshold value PD2th described in the first exemplary embodiment.

With regard to the second inter-page threshold value PD2th, as with the first exemplary embodiment, as long as the MaxDC value is a value less than or equal to the second inter-page threshold value PD2th, even in the case of recording an image with a size slightly smaller than the A2 size, the MaxDC value does not exceed the intra-page threshold value SDth in the process of recording. Thus, even in the present exemplary embodiment, if the MaxDC value is a value less than or equal to the second inter-page threshold value PD2th, wiping is never performed in the process of recording (for one page) on a subsequent recording medium with a fixed size.

In step S1223, the CPU 400 determines whether the MaxDC value exceeds the inter-page threshold value PDth. Here, the inter-page threshold value PDth is currently set to the second inter-page threshold value PD2th. If the result of determination in step S1223 is "yes" (YES in step S1223), i.e., the MaxDC value is a value exceeding the second inter-page threshold value PD2th, the CPU 400 advances the processing to wipe relevant processing in step S1224. In a case where there is a possibility of wiping being performed in the process of recording for a next page (with a fixed size) in the multipass recording mode, then in step S1224, the CPU 400 performs wiping in advance and then resets the dot count value. With this processing performed, as long as the recording for a next page is recording on a recording medium with a fixed size, there becomes no possibility of wiping being performed in the process of recording. Accordingly, even when the recording mode for a next page is the multipass mode, in the case of recording on a recording medium with a fixed size, the occurrence of a time difference unevenness is prevented or reduced.

After performing the pre-recording processing in step S1202, the CPU 400 starts recording in the multipass mode. Even at this time, the CPU 400 skips step S604 illustrated in FIG. 6.

On the other hand, if the result of determination in step S1223 is "no" (NO in step S1223), i.e., in a case where the MaxDC value is less than or equal to the second inter-page threshold value PD2th, without performing the wipe relevant processing, the CPU 400 returns the processing to the pre-recording processing in step S1202. In a case where the MaxDC value is less than or equal to the second inter-page threshold value PD2th, if the recording medium is a recording medium with a fixed size, wiping is not performed in the process of recording for a next page. Therefore, in a case where the MaxDC value is less than or equal to the second inter-page threshold value PD2th, even if the recording mode for a next page is the multipass mode, the CPU 400 returns the processing to step S1202 without performing the wipe relevant processing.

After performing the pre-recording processing in step S1202, the CPU 400 starts recording in the multipass mode. Even at this time, the CPU 400 skips step S604 illustrated in FIG. 6.

Referring back to step S1216 illustrated in FIG. 12, if the result of determination therein is "no" (NO in step S1216), i.e., in a case where a printing command for a next page has not been input until ending of step S1215, the CPU 400 advances the processing to step S1225.

In step S1225, the CPU 400 determines whether the MaxDC value is a value exceeding a post-page threshold value EDth. Furthermore, the post-page threshold value EDth is 20,000,000, i.e., 2×10 to the seventh power, which is the same as the post-page threshold value EDth described in the first exemplary embodiment.

If the result of determination in step S1225 is "yes" (YES in step S1225), i.e., in a case where the MaxDC value exceeds the post-page threshold value EDth, the CPU 400 advances the processing to step S1226 to perform wipe relevant processing. This time, since a recording command for a next page is not issued, even if the CPU 400 spends time on the wipe relevant processing, a period of time required for recording does not become long. In a case where the MaxDC value exceeds the post-page threshold value EDth, which is a relatively small value, the CPU 400 performs wiping to maintain or recover the discharge performance of the recording head 100.

After ending of the wipe relevant processing in step S1226, then in step S1227, the CPU 400 moves the cap 130 from the separation position to the capping position to perform capping, and then ends the recording operation.

On the other hand, if the result of determination in step S1225 is "no" (NO in step S1225), i.e., in a case where the MaxDC value is less than or equal to the post-page threshold value EDth, without performing wipe relevant processing, the CPU 400 advances the processing to step S1227 to perform capping. This is because, in a case where the MaxDC value is less than or equal to the post-page threshold value EDth, there is almost no ink adhering to the discharge port surface 102 of the recording head 100 and it is thus unnecessary to perform wiping. After ending of capping in step S1227, the CPU 400 ends the recording operation.

Performing the above-described control enables, while preventing or reducing the occurrence of a time difference unevenness, shortening a period of time required for recording in successively recording images for a plurality of pages. Moreover, adding, to the dot count value, a value set in consideration of a duty for an image to be recorded enables appropriately controlling timing for performing wiping.

Furthermore, as with the first exemplary embodiment, even with regard to the anomalous two-pass mode, a configuration in which there is a plurality of anomalous two-pass recording modes differing in a condition such as main scanning speed can be employed. Even in this case, the largest value of the inter-page threshold values set for the respective recording modes is set to a value larger than the largest value of the inter-page threshold values set for the respective multipass recording modes described above.

In the above-described exemplary embodiment, the CPU 400 determines whether to perform wiping in a page, between pages, or after a page according to whether a count value that is based on the number of ink droplets discharged after wiping is performed last time exceeds a threshold value. In a third exemplary embodiment, the CPU 400 determines whether to perform wiping according to whether a period of time during which the cap 130 is separate from the discharge port surface 102 exceeds a predetermined threshold value.

Figure 16:
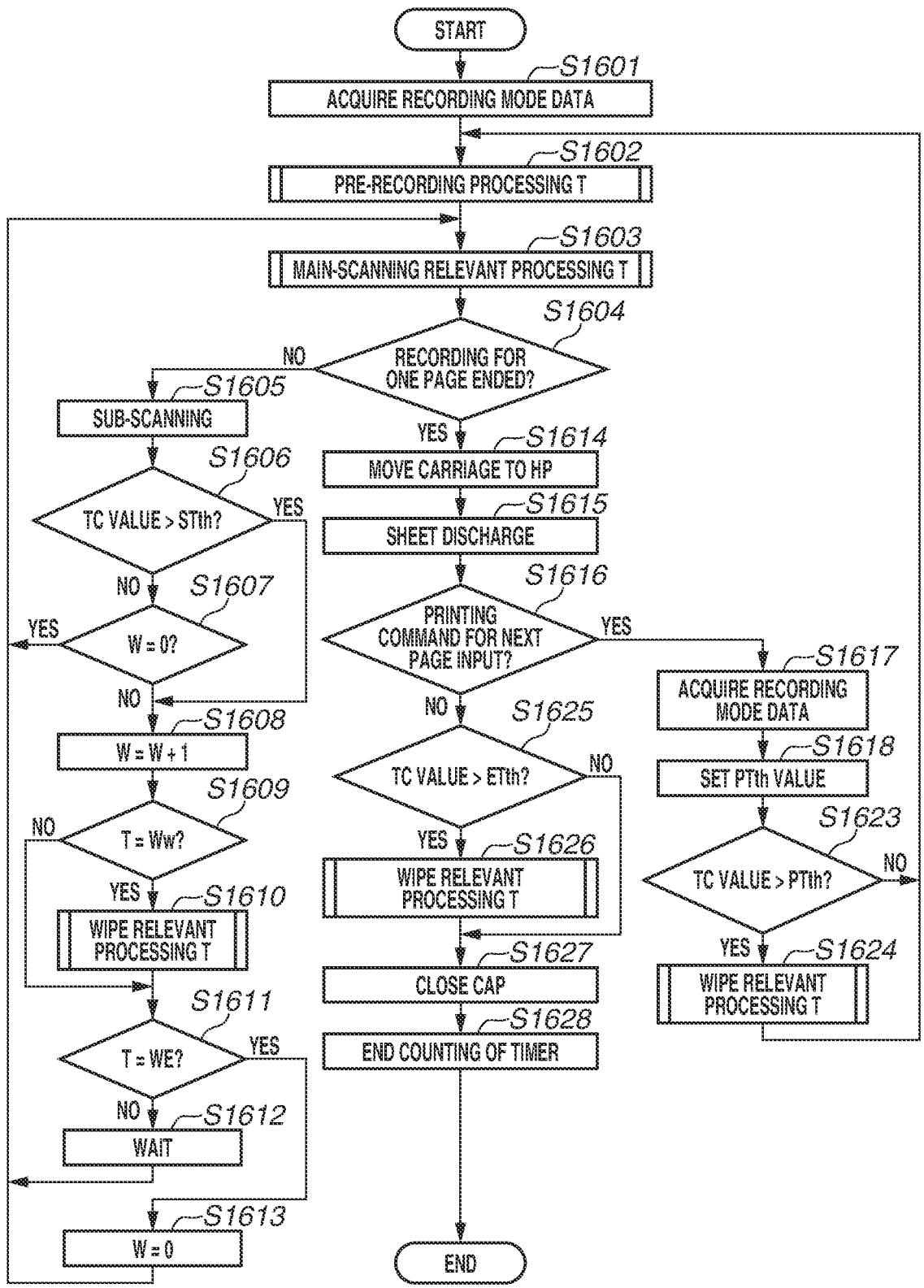
FIG. 16 is a flowchart illustrating a recording operation in a third exemplary embodiment.

FIG. 16 is a flowchart illustrating an example of a recording operation in the present exemplary embodiment. Upon receiving a printing command, in step S1601, the CPU 400 acquires recording mode data included in the printing command. In the following description, an example of a recording operation in a case where the acquired recording mode is the one-pass mode, the main scanning speed is 40 inches per second, and an image with a size slightly smaller than the A2 size is to be recorded on a recording medium with the A2 size is described.

Figure 17:
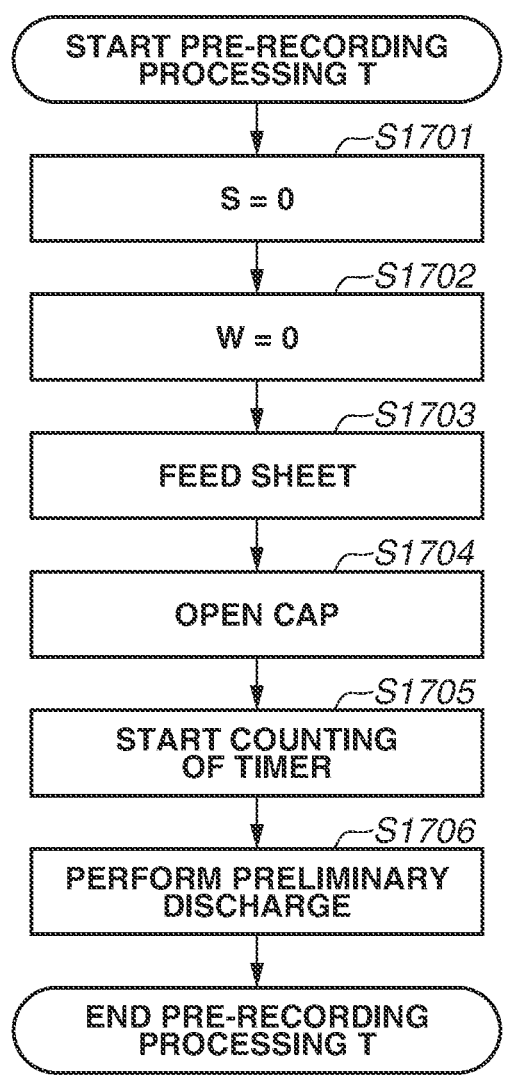
FIG. 17 is a flowchart illustrating pre-recording processing T in the third exemplary embodiment.

After ending of acquisition of the recording mode data, then in step S1602, the CPU 400 performs pre-recording processing T illustrated in FIG. 17. processing operations in step S1701 to step S1704 in the pre-recording processing T are similar to the processing operations in step S601 to step S604 illustrated in FIG. 6 and are, therefore, omitted from description.

After moving the cap 130 from the capping position to the separation position in step S1704, then in step S1705, the CPU 400 causes a timer for counting an elapsed time after the cap 130 is opened to start counting. In step S1706, the CPU 400 causes the recording head 100 to perform preliminary discharge as with step S605 illustrated in FIG. 6.

After performing preliminary discharge in step S1706, the CPU 400 ends the pre-recording processing T illustrated in FIG. 17, and then advances the processing to main-scanning relevant processing T in step S1603 illustrated in FIG. 16.

Figure 18:
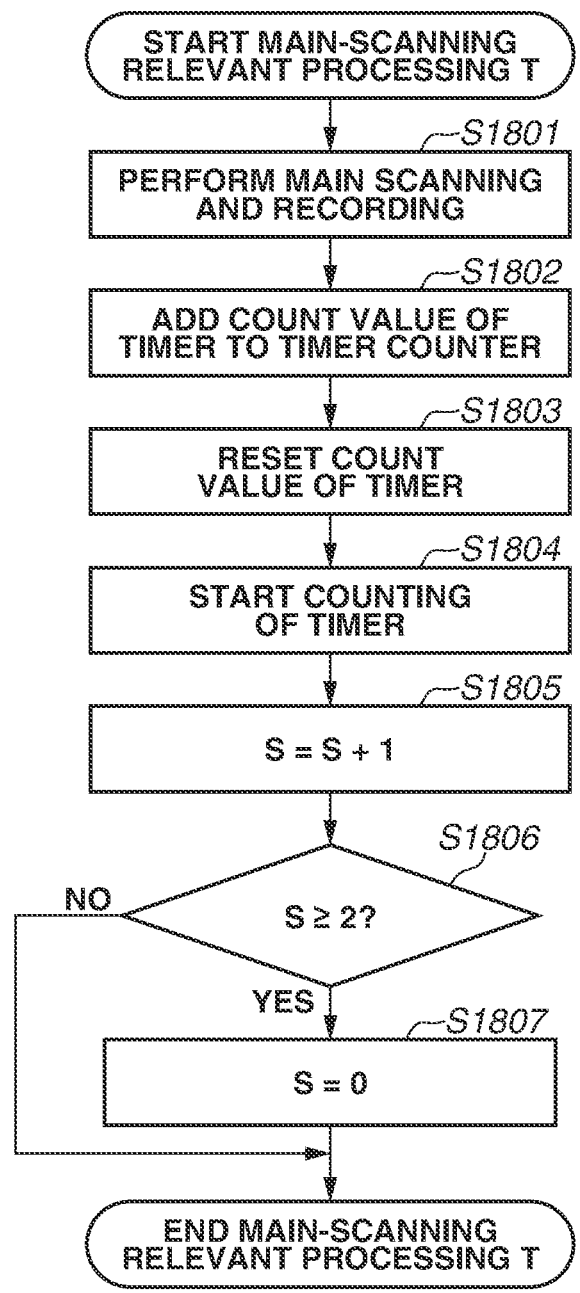
FIG. 18 is a flowchart illustrating main-scanning relevant processing T in the third exemplary embodiment.

FIG. 18 is a flowchart illustrating details of the main-scanning relevant processing T. In step S1801, the CPU 400 causes the carriage 111 to perform main scanning in the forward direction and, at the same time, causes ink to be discharged during that scanning, thus recording an image. In this occasion, the length in the sub-scanning direction of a recording region subjected to recording on a recording medium is approximately 1 inch=approximately 25.4 mm. A plan view schematically illustrating a recording medium M in the present state is similar to that illustrated in FIG. 10A.

In step S1802, the CPU 400 adds a count value of the timer started in step S1705 to a timer counter. The value of the timer counter is time information indicating an elapsed time after the cap 130 is separated. In step S1803, the CPU 400 resets the count value of the timer, and, in step S1804, the CPU 400 causes the timer to start counting again.

After performing step S1804, the CPU 400 performs processing operations in step S1805 to step S1807 similar to those in step S703 to step S705 illustrated in FIG. 7, thus updating the value of the counter S to "1", and then ends the main-scanning relevant processing T illustrated in FIG. 18.

Referring back to FIG. 16, in step S1604, the CPU 400 determines whether recording for one page has been ended by the recording operation performed in step S1801 illustrated in FIG. 18, and the result of determination in step S1604 is "no" (NO in step S1604). This is because, while, here, an example in which an image with a size slightly smaller than the A2 size is recorded is described, the length in the sub-scanning direction of a portion subjected to recording up to this point is approximately 25.4 mm.

The CPU 400 advances the processing to step S1605 to perform sub-scanning. Since the number of passes corresponds to one-pass, the amount of conveyance at this time is the length in the sub-scanning direction of a recording region subjected to recording on a recording medium, i.e., approximately 25.4 mm.

In step S1606, the CPU 400 acquires the value of the timer counter (hereinafter also referred to as a "TC value") and determines whether the TC value exceeds an intra-page threshold value STth. The intra-page threshold value STth is a threshold value used for performing control in such a way as to perform wiping between main scanning operations in a case where the TC value exceeds the intra-page threshold value STth.

As mentioned above, if the discharge port surface 102 is not capped by the cap 130, a solvent included in ink adhering to the discharge port surface 102 evaporates, so that the ink is condensed and thickened. The condensed and thickened ink is difficult to sweep away by wiping, and may eventually become unable to be swept away. Therefore, it is appropriate to set the intra-page threshold value STth to a TC value obtained when a risk for adhered ink becoming unable to be swept away with time elapsed between main scanning operations performed a few more times becomes considerably high. In the present exemplary embodiment, the intra-page threshold value STth is 8 minutes (480 seconds).

In the following description, a case where the result of determination in step S1606 is "no", i.e., in a case where the TC value does not exceed the intra-page threshold value STth, is described. If the result of determination in step S1606 is "no" (NO in step S1606), the CPU 400 advances the processing to step S1607 to determine whether the value of the counter W is "0". Since the value of the counter W at this time is "0", the result of determination in step S1607 is "yes" (YES in step S1607), so that the CPU 400 returns the processing to the main-scanning relevant processing T in step S1603.

In the main-scanning relevant processing T, in step S1801 illustrated in FIG. 18, this time, the CPU 400 causes the carriage 111 to perform main scanning in the backward direction and, at the same time, causes ink to be discharged during that scanning, thus recording an image. Even in this occasion, the length in the sub-scanning direction of a recording region subjected to recording on a recording medium is approximately 1 inch=approximately 25.4 mm. Moreover, a plan view schematically illustrating a recording medium M in the present state is similar to that illustrated in FIG. 10B.

After performing step S1801, then in step S1802, the CPU 400 adds a count value of the timer to the timer counter again. Thus, the CPU 400 adds, to the timer counter, an elapsed time from the time when counting of the timer reset once after main scanning and recording in the forward direction last time has been started again to the time when main scanning and recording in the backward direction this time have been ended. Furthermore, after adding the count value to the timer counter, then in step S1803, the CPU 400 resets the count value of the timer once and, in step S1804, starts counting of the timer again.

After performing step S1804, then in step S1805, the CPU 400 increments the value of the counter S. Since the value of the counter S at this time is "1", the value of the counter S is updated to "2" by the processing performed in step S1805.

In step S1806, the CPU 400 determines whether the value of the counter S is greater than or equal to "2". Since the value of the counter S at this time is "2", the result of determination in step S1806 is "yes" (YES in step S1806), so that the CPU 400 advances the processing to step S1807.

In step S1807, the CPU 400 resets the value of the counter S to "0", and then ends the main-scanning relevant processing T and advances the processing to step S1604 illustrated in FIG. 16.

In step S1604, the CPU 400 determines whether recording for one page has been ended by the recording operation performed in step S1801. Since, at this time, the length in the sub-scanning direction of a portion subjected to recording is approximately 25.4 mm×2=approximately 50.8 mm, the result of determination in step S1604 is "no" (NO in step S1604), so that the CPU 400 advances the processing to step S1605 again.

In step S1605, the CPU 400 performs sub-scanning. Furthermore, the amount of conveyance of the recording medium at this time is also the length in the sub-scanning direction of a recording region subjected to recording on the recording medium in step S1801, i.e., approximately 25.4 mm.

In step S1606, the CPU 400 determines whether the TC value exceeds the intra-page threshold value STth, and, if the result of determination in step S1606 is "no" (NO in step S1606), the CPU 400 advances the processing to step S1607.

In step S1607, the CPU 400 determines whether the value of the counter W is "0", and, since the value of the counter W at this time is "0", the result of determination in step S1607 is "yes" (YES in step S1607), so that the CPU 400 returns the processing to step S1603 again. Thus, in a case where the TC value does not exceed the intra-page threshold value STth, the CPU 400 repeats the processing in step S1603 to S1607 until the result of determination in step S1604 becomes "yes". After ending of recording of an image for one page (YES in step S1604), the CPU 400 advances the processing to step S1614.

On the other hand, if the result of determination in step S1606 is "yes" (YES in step S1606), i.e., in a case where the TC value exceeds the intra-page threshold value STth, as with the first and second exemplary embodiments, the CPU 400 repeats the processing in step S1603 to step S1613, thus performing wiping between main scanning operations. With regard to wipe relevant processing T in the present exemplary embodiment, only portions different from those of the wipe relevant processing described in the above-described exemplary embodiments are described.

Figure 19:
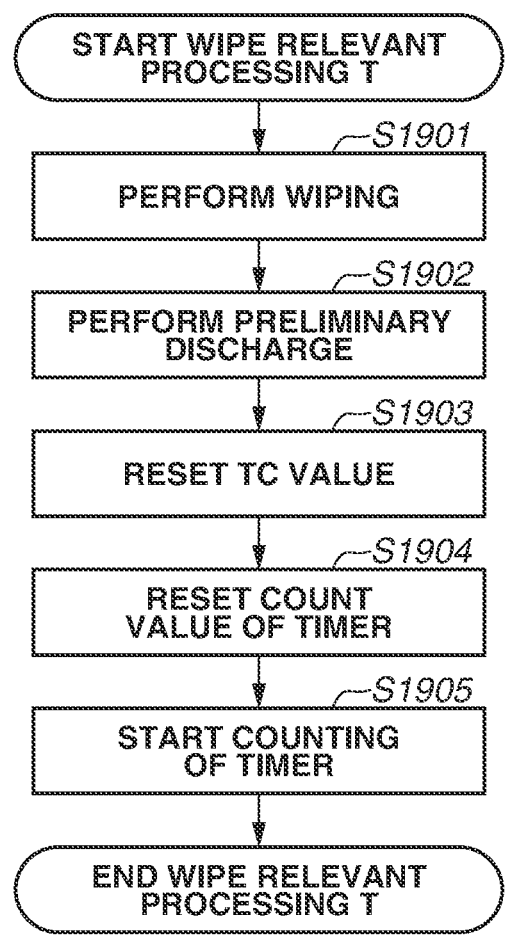
FIG. 19 is a flowchart illustrating wiping relevant processing in the third exemplary embodiment.

FIG. 19 is a flowchart illustrating details of the wipe relevant processing T. First, in step S1901, the CPU 400 performs wiping similar to that in step S801. Then, in step S1902, the CPU 400 performs preliminary discharge similar to that in step S803.

After performing step S1902, then in step S1903, the CPU 400 resets the value of the timer counter, i.e., the TC value, to "0". Since wiping has been performed, the TC value, based on which to determine whether to perform wiping, is reset. In step S1904, the CPU 400 resets the count value of the timer once. After that, in step S1905, the CPU 400 starts counting of the timer again and then ends the wipe relevant processing T. As with the above-described exemplary embodiments, a time of about 15 seconds is also required for the wipe relevant processing T in the present exemplary embodiment.

After performing wiping between main scanning operations, the CPU 400 returns the processing to step S1603, and then repeats the processing in step S1603 to step S1607 until the result of determination in step S1604 becomes "yes". After ending of recording of an image for one page, the CPU 400 advances the processing to step S1614.

In step S1614, the CPU 400 causes the carriage 111 to be moved to the home position. In step S1615, the CPU 400 causes the recording medium to be discharged.

In step S1616, the CPU 400 determines whether a printing command for a next page has been input. If the result of determination in step S1616 is "yes" (YES in step S1616), i.e., in a case where a printing command for a next page has been input, the CPU 400 advances the processing to step S1617 to acquire recording mode data included in the printing command for a next page.

In step S1618, the CPU 400 sets an inter-page threshold value PTth to a value shown in a table illustrated in FIG. 20 according to the acquired recording mode data. For example, in a case where number-of-passes data and main scanning speed data included in the acquired recording mode data indicate eight-pass and a main scanning speed of 10 inches per second, respectively, the inter-page threshold value PTth is set to 100 seconds.

In FIG. 20, each setting value to be set for the inter-page threshold value PTth in a case where the number-of-passes data for a next page indicates two-pass to eight-pass is a value based on which, as long as the image size for a next page is a fixed size, there is an extremely low possibility of the TC value exceeding the intra-page threshold value STth in the process of image recording. For example, unless data transfer from the host computer 490 becomes delayed for any reason, the TC value does not exceed the intra-page threshold value STth in the process of image recording (as long as the image size for a next page is a fixed size). Thus, wiping is never performed in the process of image recording, so that the possibility of a time difference unevenness occurring in a recorded image is extremely low.

On the other hand, each setting value to be set for the inter-page threshold value PTth in a case where the number-of-passes data for a next page indicates one-pass is not set to such a value as mentioned above because, in the case of the one-pass recording method, a time difference unevenness does not occur even if wiping is performed between main scanning operations. Specifically, such a setting value for the inter-page threshold value PTth is set such that, when the main scanning speed in the recording mode for a next page is 40 inches per second or 20 inches per second, if the image for a next page is an image with a size slightly smaller than the A2 size, wiping between main scanning operations may be performed. Setting the inter-page threshold value PTth to such a value enables decreasing the frequency of wiping and shortening a period of time required for recording in successively recording images for a plurality of pages.

However, in a case where the recording mode for a next page is a recording mode for one-pass and 10 inches per second, if the inter-page threshold value PTth is set to a setting value included in the table illustrated in FIG. 20, as long as the image size for a next page is a fixed size, the possibility of wiping being performed in the process of recording is extremely low. In other words, the inter-page threshold value PTth is set such that, as long as the image size for a next page is a fixed size, the possibility of wiping between main scanning operations being performed is extremely low.

Most recording media exhibit a tendency to, if absorbing ink, deform and then float from the platen 120. Moreover, in the case of a recording mode requiring a relatively long recording time such as a recording mode for one-pass and 10 inches per second, most recording media also exhibit a tendency to become large in the amount of flotation by which a recording medium floats from the platen 120. If a wiping operation is performed between main scanning operations in a state in which the amount of flotation of a recording medium from the plate 120 has become large, the risk that the discharge port surface 102 and the recording medium may come into contact with each other, thus soiling the recording medium, increases. To avoid such a risk, in a case where the recording mode for a next page is a recording mode for one-pass and 10 inches per second, the inter-page threshold value PTth is set such that wiping between main scanning operations is performed as less frequently as possible and wiping is performed at an interval between pages in which no recording medium is present on the platen 120.

Thus, even if the recording mode for a next page is the one-pass mode, it is not necessary that all of the inter-page threshold values PTth in the one-pass mode are larger than the inter-page threshold values PTth used when the recording mode for a next page is the multipass mode, i.e., are set in such a way as to make wiping between pages unlikely to be performed.

Referring back to FIG. 16, after ending of setting of the inter-page threshold value PTth in step S1618, then in step S1623, the CPU 400 determines whether the TC value is a value exceeding the inter-page threshold value PTth. If the result of determination in step S1623 is "yes" (YES in step S1623), i.e., in a case where the TC value is a value exceeding the inter-page threshold value PTth, the CPU 400 advances the processing to wipe relevant processing T in step S1624. The wipe relevant processing T in step S1624 is similar to the wipe relevant processing Tin step S1610 and is, therefore, omitted from description. After performing the pre-recording processing T in step S1602, the CPU 400 starts recording for a next page according the recording mode acquired in step S1617.

Processing for moving the cap 130 from the capping position to the separation position in step S1704 illustrated in FIG. 17 is skipped here because the cap 130 is already situated at the separation position. Moreover, processing in step S1705 is also skipped because counting of the timer is already started in step S1905.

On the other hand, if the result of determination in step S1623 is "no" (NO in step S1623), i.e., in a case where the TC value is a value less than or equal to the inter-page threshold value PTth, without performing the wipe relevant processing T, the CPU 400 returns the processing to the pre-recording processing T in step S1602. Then, after performing processing illustrated in the flowchart of FIG. 17, the CPU 400 starts recording for a next page according the recording mode acquired in step S1617.

Furthermore, at this time, step S1704 illustrated in FIG. 17 is also skipped. Moreover, processing in step S1705 is also skipped because counting of the timer is already started in step S1804.

With the above-described processing in step S1617 to step S1624, in a case where the recording mode for a next page is a recording mode for one-pass and 40 inches per second or one-pass and 20 inches per second, the frequency of wiping is decreased and a period of time required for recording in successively recording images for a plurality of pages is shortened. Moreover, in a case where the recording mode for a next page is a recording mode other than the recording mode for one-pass and 40 inches per second or one-pass and 20 inches per second, as long as the image size for a next page is a fixed size, the possibility of wiping being performed between main scanning operations is extremely low. Accordingly, the possibility of a time difference unevenness occurring in a recorded image becomes extremely low.

On the other hand, if the result of determination in step S1616 illustrated in FIG. 16 is "no" (NO in step S1616), i.e., in a case where a printing command for a next page has not been input until ending of step S1615, the CPU 400 advances the processing to step S1625. In step S1625, the CPU 400 determines whether the TC value is a value exceeding a post-page threshold value ETth, and, if the result of determination in step S1625 is "yes" (YES in step S1625), i.e., the TC value exceeds the post-page threshold value ETth, the CPU 400 advances the processing to step S1626. Furthermore, the post-page threshold value ETth in the present exemplary embodiment is 80 seconds.

In step S1626, the CPU 400 performs wipe relevant processing T. Since, when a printing command for a next page has not been input, even if the CPU 400 performs the wipe relevant processing T, a period of time required for recording does not become long, in a case where the TC value exceeds the post-page threshold value ETth, which is a relatively small value, the CPU 400 performs wiping to maintain or recover the discharge performance in advance.

After ending of the wipe relevant processing Tin step S1626, then in step S1627, the CPU 400 moves the cap 130 from the separation position to the capping position to perform capping. In step S1628, the CPU 400 ends counting of the timer, and then ends the recording operation.

On the other hand, if the result of determination in step S1625 is "no" (NO in step S1625), i.e., the TC value is less than or equal to the post-page threshold value ETth, without performing the wipe relevant processing T, the CPU 400 advances the processing to step S1627 to perform capping. The CPU 400 advances the processing to step S1628 to end counting of the timer, and then ends the recording operation.

Performing the above-described control enables, while preventing or reducing the occurrence of a time difference unevenness, shortening a period of time required for recording in successively recording images for a plurality of pages.

In the above-described exemplary embodiments, a recording medium for use in recording an image can be sheet-like or roll-like. In the case of recording an image on a roll-like recording medium, what is called roll paper, it is favorable to add a process of cutting a roll-like recording medium before the sheet discharge process in the flowcharts of FIG. 5, FIG. 12, and FIG. 16.

Moreover, in the present specification, the term "page" means the number of pages of a recording medium for use in recording, and, for example, even in the case of recording a plurality of images on one page of a recording medium, if the recording medium is one page, the number of pages to be applied to the above-described exemplary embodiments is "1". In addition, similarly in the case of performing recording on a roll-like recording medium, the term "number of pages" in the present specification means the number of pages of a recording medium after being cut. However, with regard to cutting in the sub-scanning direction, this is not the case.

Additionally, while, in the first and second exemplary embodiments, the one-pass mode includes only one type, the one-pass mode can include a plurality of types as in the third exemplary embodiment. Moreover, at that time, inter-page threshold values for the respective types of the one-pass mode can be respective different values as in the third exemplary embodiment. In addition, it is not necessary that all of the inter-page threshold values for the respective types of the one-pass mode are set larger than the inter-page threshold value for the multipass mode (are set such that wiping between pages is unlikely to be performed).

Additionally, while each recording mode in the above-described exemplary embodiments includes the number of passes, the manners of main and scanning operations such as anomalous two-pass, and the main scanning speed, the present exemplary embodiment is not limited to such examples. Each recording mode can include other items such as a usable ink discharge port region for each main scanning operation and an image resolution.

Moreover, while, in the above-described exemplary embodiments, the recovery operation has been described with wiping taken as an example, the present exemplary embodiment is not limited to such an example. The recovery operation can be, for example, what is called a suctioning operation using, for example, the suction pump 132 or a preliminary discharge operation.

Moreover, while an example in which, with regard to wiping, what is called a longitudinal wiping type, in which a wiper moves in the directions Y1 and Y2 illustrated in FIG. 2, is employed has been described, the present exemplary embodiment is not limited to such an example. For example, the present exemplary embodiment can be applied to an inkjet recording apparatus employing what is called a transverse wiping type, in which the carriage 111 moves in the direction X1 or X2 illustrated in FIG. 1 and a wiper wipes the discharge port surface 102 of the recording head 100 during that movement.

Additionally, while, in the above-described exemplary embodiments, the recording head 100 included in the inkjet recording apparatus is what is called a thermal-type recording head, in which an electro-thermal conversion member is included in the inside of each discharge port, the present exemplary embodiment is not limited to such an example. The recording head 100 can be what is called a piezoelectric-type recording head, in which an electro-mechanical conversion member is included in the inside of each discharge port.

Moreover, in the above-described exemplary embodiments, what is called a serial-type inkjet recording apparatus, which performs main scanning for the recording head 100 in the main scanning direction and sub-scanning for a recording medium in the sub-scanning direction, has been described. Any type of inkjet recording apparatus can be employed as long as the inkjet recording apparatus has a configuration which performs relative scanning by moving a recording medium and a recording head relative to each other. For example, embodiments of the present disclosure include a recording apparatus which uses what is called a full-multiple-type recording head, in which a plurality of recording elements is arrayed in a direction intersecting with a direction in which a recording medium is conveyed. Controlling wiping between pages according to the number of times of relative scanning between a recording head and a recording medium with respect to a unit region on the recording medium in a recording operation for a next page enables reducing a period of time required for a recording operation.

Embodiments of the present disclosure are able to appropriately determine necessity of execution of an inter-page recovery operation and thus shorten a period of time required for recording and increase a throughput while maintaining and recovering an ink discharge performance.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-123120, filed Jul. 17, 2020, which is hereby incorporated by reference herein in its entirety.

What is claimed is:

1. A recording apparatus comprising:
a recording unit configured to record an image by applying a recording material by a recording element to a recording medium;
a scanning unit configured to perform relative scanning by moving the recording unit and a recording medium relative to each other at least once with respect to a unit region on the recording medium;
a recovery unit configured to perform a recovery operation for maintaining or recovering a recording performance of the recording unit for application of the recording material; and
a control unit configured to control the recovery unit,
wherein the control unit acquires recording mode information about recording of an image to be performed on a recording medium for (n+1)-th page (n being a natural number) and determines, based on the acquired recording mode information, whether to perform an inter-page recovery operation at timing after recording of an image on a recording medium for n-th page ends and before recording of an image on a recording medium for (n+1)-th page starts.

2. The recording apparatus according to claim 1, wherein the scanning unit includes:
a main scanning unit configured to perform main scanning to move the recording unit in a first direction; and
a sub-scanning unit configured to perform sub-scanning to move a recording medium in a second direction intersecting with the first direction.

3. The recording apparatus according to claim 1, wherein the control unit acquires a dot count value indicating a number of times for which the driving element has been driven after the recovery operation performed last time, and determines, based on the acquired dot count value, whether to perform the inter-page recovery operation.

4. The recording apparatus according to claim 3, wherein, when a length in the second direction of a recording region in which the recording unit is capable of performing recording on a recording medium in the main scanning performed once is denoted by L, recording modes to be acquired as the recording mode information include:

a first recording mode group which records an image by repeatedly performing the sub-scanning in which an amount by which to move a recording medium is approximately equal to the L and a recording operation caused by the main scanning; and a second recording mode group which records an image by repeatedly performing the sub-scanning in which an amount by which to move a recording medium is less than the L and a recording operation caused by the main scanning.

5. The recording apparatus according to claim 4,
wherein, in a case where the recording mode information indicates a recording mode included in the first recording mode group, the control unit determines to perform the inter-page recovery operation when the acquired dot count value is larger than an inter-page threshold value corresponding to the indicated recording mode included in the first recording mode group, wherein, in a case where the recording mode information indicates a recording mode included in the second recording mode group, the control unit determines to perform the inter-page recovery operation when the acquired dot count value is larger than an inter-page threshold value corresponding to the indicated recording mode included in the second recording mode group, and wherein a largest value among a plurality of inter-page threshold values set for respective recording modes included in the first recording mode group is larger than a largest value among a plurality of inter-page threshold values set for respective recording modes included in the second recording mode group.

6. The recording apparatus according to claim 4,
wherein the recording modes to be acquired as the recording mode information further include a third recording mode group which records an image by repeatedly performing a recording operation in a forward direction caused by the main scanning in the first direction, a recording operation in a backward direction caused by the main scanning in a direction opposite to the first direction, and the sub-scanning in which an amount by which to move a recording medium is approximately equal to the L, wherein, in a case where the recording mode information indicates a recording mode included in the third recording mode group, the control unit determines to perform the inter-page recovery operation when the acquired dot count value is larger than an inter-page threshold value corresponding to the indicated recording mode included in the third recording mode group, and wherein a largest value among a plurality of inter-page threshold values set for respective recording modes included in the third recording mode group is larger than a largest value among a plurality of inter-page threshold values set for respective recording modes included in the second recording mode group.

7. The recording apparatus according to claim 6, wherein the control unit determines, based on the acquired dot count value, whether to perform an intra-page recovery operation at timing after given relative scanning performed by the scanning unit ends and before next relative scanning performed thereby starts.

8. The recording apparatus according to claim 7, wherein the control unit determines to perform the intra-page recovery operation when the acquired dot count value is larger than a predetermined intra-page threshold value.

9. The recording apparatus according to claim 8, wherein the predetermined intra-page threshold value is larger than a largest value among a plurality of inter-page threshold values set for respective recording modes included in the first recording mode group and is larger than a largest value among a plurality of inter-page threshold values set for respective recording modes included in the third recording mode group.

10. The recording apparatus according to claim 3, wherein, in a case where a command for giving an instruction to record an image on a recording medium for (n+1)-th page is not received, the control unit determines to perform the recovery operation after recording of an image on a recording medium for n-th page ends, when the acquired dot count value is larger than a predetermined post-page threshold value.

11. The recording apparatus according to claim 10, wherein the predetermined post-page threshold value is smaller than a smallest value among a plurality of inter-page threshold values set for respective recording modes included in the second recording mode group.

12. The recording apparatus according to claim 3, wherein the dot count value is a value weighted based on the number of times of driving per unit area.

13. The recording apparatus according to claim 1, wherein the control unit acquires time information indicating an elapsed time from predetermined timing, and determines, based on the acquired time information, whether to perform the inter-page recovery operation.

14. The recording apparatus according to claim 13, further comprising a cap configured to seal a discharge port surface in which discharge ports each for discharging a recording material by energy generated by the recording element are provided,
wherein the time information indicates an elapsed time from timing at which the discharge port surface has been separated from the cap.

15. The recording apparatus according to claim 13,
wherein, when a length in the second direction of a recording region in which the recording unit is capable of performing recording on a recording medium in the main scanning performed once is denoted by L, recording modes to be acquired as the recording mode information include:

a first recording mode group which records an image by repeatedly performing the sub-scanning in which an amount by which to move a recording medium is approximately equal to the L and a recording operation caused by the main scanning; and a second recording mode group which records an image by repeatedly performing the sub-scanning in which an amount by which to move a recording medium is less than the L and a recording operation caused by the main scanning, wherein, in a case where the recording mode information indicates a recording mode included in the first recording mode group, the control unit determines to perform the inter-page recovery operation when the elapsed time indicated by the acquired time information is longer than a threshold time corresponding to the indicated recording mode included in the first recording mode group, wherein, in a case where the recording mode information indicates a recording mode included in the second recording mode group, the control unit determines to perform the inter-page recovery operation when the elapsed time indicated by the acquired time information is longer than a threshold time corresponding to the indicated recording mode included in the second recording mode group, and wherein a longest value among a plurality of threshold times for respective recording modes included in the first recording mode group is longer than a longest value among a plurality of threshold times set for respective recording modes included in the second recording mode group.

16. The recording apparatus according to claim 15, wherein the recording modes to be acquired as the recording mode information further include a third recording mode group which records an image by repeatedly performing a recording operation in a forward direction caused by the main scanning in the first direction, a recording operation in a backward direction caused by the main scanning in a direction opposite to the first direction, and the sub-scanning in which an amount by which to move a recording medium is approximately equal to the L, wherein, in a case where the recording mode information indicates a recording mode included in the third recording mode group, the control unit determines to perform the inter-page recovery operation when the elapsed time indicated by the acquired time information is longer than a threshold time set for the indicated recording mode included in the third recording mode group, and wherein a longest value among a plurality of threshold times set for respective recording modes included in the third recording mode group is longer than a longest value among a plurality of threshold times set for respective recording modes included in the second recording mode group.

17. The recording apparatus according to claim 16, wherein the control unit determines, based on the acquired time information, whether to perform an intra-page recovery operation at timing after given relative scanning performed by the scanning unit ends and before next relative scanning performed thereby starts.

18. The recording apparatus according to claim 17, wherein the control unit determines to perform the intra-page recovery operation when the elapsed time indicated by the acquired time information is longer than a predetermined time.

19. The recording apparatus according to claim 18, wherein the predetermined time is longer than a longest time among a plurality of threshold times set for respective recording modes included in the first recording mode group and is longer than a longest time among a plurality of threshold times set for respective recording modes included in the third recording mode group.

20. The recording apparatus according to claim 13, wherein, in a case where a command for giving an instruction to record an image on a recording medium for (n+1)-th page is not received, the control unit determines to perform the recovery operation after recording of an image on a recording medium for n-th page ends, when the elapsed time indicated by the acquired time information is longer than a predetermined post-page time.

21. The recording apparatus according to claim 20, wherein the predetermined post-page time is shorter than a shortest value among a plurality of threshold times set for the second recording mode group.

22. The recording apparatus according to claim 1, wherein the control unit acquires the recording mode information corresponding to a recording medium for (n+1)-th page before recording of an image on a recording medium for n-th page ends.

23. The recording apparatus according to claim 1, wherein the recovery operation by the recovery unit is wiping which uses a wiping member to wipe a discharge port surface in which discharge ports each for discharging a recording material by energy generated by the recording element are provided.

24. A control method for a recording apparatus, the recording apparatus including a recording unit configured to record an image by applying a recording material by a recording element to a recording medium, a scanning unit configured to perform relative scanning by moving the recording unit and a recording medium relative to each other at least once with respect to a unit region on the recording medium, and a recovery unit configured to perform a recovery operation for maintaining or recovering a recording performance of the recording unit for application of the recording material, the control method comprising:

acquiring recording mode information about recording of an image to be performed on a recording medium for (n+1)-th page (n being a natural number);

determining, based on the acquired recording mode information, whether to perform an inter-page recovery operation by the recovery unit at timing after recording of an image on a recording medium for n-th page ends and before recording of an image on a recording medium for (n+1)-th page starts; and controlling the recovery unit to perform the recovery operation based on a result of the determining.

25. A recording apparatus comprising:

a recording unit configured to record an image by applying a recording material by a recording element to a recording medium;

a scanning unit configured to perform relative scanning by moving the recording unit and a recording medium relative to each other at least once with respect to a unit region on the recording medium;

a recovery unit configured to perform a recovery operation for maintaining or recovering a recording performance of the recording unit for application of the recording material; and a control unit configured to control the recovery unit, wherein the control unit determines, based on a number of times for which, to complete recording of an image in a unit region on a recording medium for (n+1)-th page (n being a natural number), the recording unit is caused to perform relative scanning with respect to the unit region, whether to perform an inter-page recovery operation at timing after recording of an image on a recording medium for n-th page ends and before recording of an image on a recording medium for (n+1)-th page starts.

26. The recording apparatus according to claim 25, wherein the control unit decreases a frequency of performing the inter-page recovery operation in a case where the number of times for which the recording unit is caused to perform relative scanning with respect to the unit region is one than in a case where the number of times for which the recording unit is caused to perform relative scanning with respect to the unit region is two or more.

27. A non-transitory computer-readable storage medium storing computer-executable instructions that, when executed by a computer, cause the computer to perform a control method for a recording apparatus, the recording apparatus including a recording unit configured to record an image by applying a recording material by a recording element to a recording medium, a scanning unit configured to perform relative scanning by moving the recording unit and a recording medium relative to each other at least once with respect to a unit region on the recording medium, and a recovery unit configured to perform a recovery operation for maintaining or recovering a recording performance of the recording unit for application of the recording material, the control method comprising:

acquiring recording mode information about recording of an image to be performed on a recording medium for (n+1)-th page (n being a natural number);

determining, based on the acquired recording mode information, whether to perform an inter-page recovery operation by the recovery unit at timing after recording of an image on a recording medium for n-th page ends and before recording of an image on a recording medium for (n+1)-th page starts; and controlling the recovery unit to perform the recovery operation based on a result of the determining.

* * * * *